US012811939B2

(12) United States Patent
Huang et al.

(10) Patent No.: US 12,811,939 B2
(45) Date of Patent: Nov. 24, 2026

(54) COMMUNICATION METHOD, APPARATUS, AND DEVICE WITH SERVICE AND ACCESS PERMISSION CONTROL

(71) Applicant: Huawei Technologies Co., Ltd., Shenzhen (CN)

(72) Inventors: Cheng Huang, Shenzhen (CN); Yaoguang Wang, Shanghai (CN); Longyu Cao, Shanghai (CN); Yijun Yu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 18/495,889

(22) Filed: Oct. 27, 2023

(65) Prior Publication Data

US 2024/0056449 A1 Feb. 15, 2024

Related U.S. Application Data

(63) Continuation of application No. PCT/CN2022/088733, filed on Apr. 24, 2022.

(30) Foreign Application Priority Data

Apr. 30, 2021 (CN) ........................ 202110480099.X

(51) Int. Cl.
*H04L 9/40* (2022.01)

(52) U.S. Cl.
CPC .................................... *H04L 63/10* (2013.01)

(58) Field of Classification Search
None
See application file for complete search history.

(56) References Cited

U.S. PATENT DOCUMENTS 10,055,607 B2 * 8/2018 Sathyadevan ......... G06F 21/554
2004/0073436 A1 * 4/2004 Vaishnavi ........ G06Q 10/06398 705/7.42
2006/0242281 A1 * 10/2006 Fan ....................... H04L 41/052 709/223
2012/0147798 A1 * 6/2012 Miller, II ................ H04Q 9/00 370/310
2015/0063166 A1 * 3/2015 Sif .......................... H04L 41/40 455/418

(Continued)

OTHER PUBLICATIONS

Nokia et al:"TD tenant information to support multi-tenancy for network slice management",3GPP TSG-SA5 Meeting #135e, e-meeting, Jan. 25-Feb. 3, 2021, S5-211458, total 3 pages.

(Continued)

*Primary Examiner* — James R Turchen
(74) *Attorney, Agent, or Firm* — Slater Matsil, LLP

(57) ABSTRACT

This application provides a communication method, apparatus, and device. In the method, when a target tenant has a network operation and maintenance management requirement for accessing first information by using a first service, an NMS of the target tenant can successfully access the first information regardless of whether the target tenant has permission to invoke the first service. In addition, the first information is transmitted between an EMS and the tenant NMS of the target tenant without passing through an operator NMS. Therefore, security of the first information can be ensured.

19 Claims, 11 Drawing Sheets

(56) References Cited

U.S. PATENT DOCUMENTS

| | | | | |
|---|---|---|---|---|
| 2015/0134618 | A1* | 5/2015 | Teterin | G06F 11/1456<br>707/654 |
| 2017/0214694 | A1* | 7/2017 | Yan | H04L 63/1441 |
| 2018/0367515 | A1* | 12/2018 | Anandam | H04L 63/10 |
| 2020/0067782 | A1* | 2/2020 | Yousaf | H04L 41/5051 |
| 2020/0177460 | A1* | 6/2020 | Xu | H04L 41/0894 |
| 2020/0383034 | A1* | 12/2020 | Oetting | H04W 12/61 |
| 2022/0078696 | A1* | 3/2022 | Saxena | H04W 8/08 |

OTHER PUBLICATIONS

"3rd Generation Partnership Project; Technical Specification Group Services and System Aspects; Telecommunication management; Study on tenancy concept in 5G networks and network slicing management (Release 16)," 3GPP TR28.804, V16.0.1, Oct. 10, 2019 (Oct. 10, 2019), pp. 1-14, XP051785388.

* cited by examiner

COMMUNICATION METHOD, APPARATUS, AND DEVICE WITH SERVICE AND ACCESS PERMISSION CONTROL

CROSS-REFERENCE TO RELATED APPLICATIONS

This application is a continuation of International Application No. PCT/CN2022/088733 filed on Apr. 24, 2022 which claims priority to Chinese Patent Application No. 202110480099.X, filed on Apr. 30, 2021. The disclosures of the aforementioned applications are hereby incorporated by reference in their entireties.

TECHNICAL FIELD

This application relates to the field of communication technologies, and in particular, to a communication method, apparatus, and device.

BACKGROUND

Due to features such as high bandwidth, connectivity of everything, and low power consumption of a 5th generation (5G) communication technology, in addition to a mobile communication system, the 5G communication technology may be further extended to a network operation and maintenance scenario.

Refer to FIG. 1. A current network operation and maintenance architecture based on the 5G communication technology usually includes three layers: a network element (NE), an element management system (EMS), and a network management system (NMS).

NEs are various network devices that are included in a network, and may include but are not limited to a base station, an access point, various core network devices, and the like. Optionally, the NE may be a physical entity device, or may be a virtualized network function. This is not limited in this application. The EMS may manage the NE, is also a provider (producer) of a network operation and maintenance management service, and may perform a specific network operation and maintenance management service operation based on a service invoking request sent by the NMS. The NMS, as an invoker (consumer) of a network operation and maintenance management service, can send a service invoking request to the EMS based on a network operation and maintenance management requirement of a customer, to invoke a network operation and maintenance management service that is in the EMS and that meets the operation and maintenance management requirement of the customer. The EMS and the NMS each include at least one device. The device in the EMS may be referred to as an element management device, and the device in the NMS may be referred to as a network management device.

Currently, an organization (for example, an enterprise or a company) having a networking capability may maintain and manage, by using the network operation and maintenance architecture shown in FIG. 1, a private network deployed by the organization. However, some organizations have no capability of independently performing network operation and maintenance management. Therefore, many organizations choose to rent a network operation and maintenance management service of an operator NMS, that is, perform network operation and maintenance management through the operator in a hosting mode.

Many organizations have a requirement for security protection of data and a network resource on a private network.

Some organizations require data not to leave a campus to prevent private data leakage. The data may include but is not limited to service data and network management data. The network management data may include network configuration management data, network performance management data, network fault management data, and the like. The network resource may include a physical network element (for example, a physical network function (PNF)), a virtualized network function (for example, a virtualized network function (VNF)), a container network element (for example, a container network function (CNF)), and the like. Information, for example, a usage rate or inventory of the network resource may be obtained by accessing the network resource.

The following uses a vertical industry as an example for description. The vertical industry is an enterprise with a clear downstream user. The vertical industries usually develop products for a specific user group. Because a trade secret exists, the vertical industry usually raises a privacy and security protection requirement for data and a network resource on a network.

However, when a plurality of organizations perform network operation and maintenance management on the private network through the operator in the hosting mode, security risks of the data and the network resource on the private network may be caused. For example, the data or the network resource on the private network may be leaked to the operator. For another example, if different organizations access the data and the network resource through a same operator NMS, the network data of the different organizations may also have a risk of cross leakage.

SUMMARY

This application provides a communication method, apparatus, and device, to ensure information security of a private network in a network operation and maintenance architecture.

According to a first aspect, an embodiment of this application provides a communication method. The method may be applied to an element management device in an EMS in a network operation and maintenance architecture. The method includes the following steps.

The element management device obtains service permission information of a target tenant, and obtains access permission information of the target tenant, where the service permission information indicates that a first network management device has permission to invoke a first service, the first network management device is located in a network management system of the target tenant, and the access permission information indicates that the first network management device has permission to access first information. After receiving an access request from the first network management device, the element management device sends the first information to the first network management device based on the service permission information, the access permission information, and a first information parameter, where the access request includes the first information parameter, and the access request is for requesting to access, by using the first service, the first information indicated by the first information parameter.

According to this method, a tenant having a specific network operation and maintenance capability in the network operation and maintenance architecture has permission to directly invoke some services in the EMS. In the method, the element management device in the EMS maintains the service permission information and the access permission information of the target tenant. When the target tenant has a network operation and maintenance management requirement, the first network management device in the tenant NMS of the target tenant may directly interact with the element management device in the EMS, and invoke the service in the element management device, to implement information access. Because the foregoing service invoking and information access processes are implemented through interaction between the first network management device and the element management device, and a second network management device in an operator NMS does not participate in the processes, privacy leakage is not caused in the method, and information security of a private network can be ensured.

In a possible design, the element management device may obtain the service permission information of the target tenant in the following manner.

Manner 1: The service permission information is received from the first network management device.

Manner 2: The service permission information is received from the second network management device.

Manner 3: The preconfigured service permission information is obtained.

Based on the design, flexibility of obtaining the service permission information of the target tenant by the element management device can be improved.

In a possible design, the element management device may obtain the access permission information of the target tenant in the following manner.

Manner 1: The access permission information is received from the first network management device.

Manner 2: The access permission information is received from the second network management device.

Manner 3: The preconfigured access permission information is obtained.

Based on the design, flexibility of obtaining the access permission information of the target tenant by the element management device can be improved.

In a possible design, the first information includes first network operation and maintenance management data and/or first network resource data.

In a possible design, the element management device may send the first information to the first network management device based on the service permission information, the access permission information, and the first information parameter by using the following steps.

The element management device verifies, based on the service permission information, that the first network management device has the permission to invoke the first service, and verifies, based on the access permission information, that the first network management device has the permission to access the first information. Then, the element management device invokes the first service based on the first information parameter, to obtain the first information indicated by the first information parameter. Finally, the element management device sends the first information to the first network management device.

In this manner, the element management device may perform service invoking permission verification and information access permission verification on the first network management device, invoke the first service to obtain the first information after the verification succeeds, and send the first information to the first network management device. The element management device may perform permission verification on the first network management device, to ensure security of the first information.

In a possible design, the access request further includes an identifier of the target tenant.

According to a second aspect, an embodiment of this application provides a communication method. The method may be applied to a first network management device located in a tenant NMS of a target tenant in a network operation and maintenance architecture. The method includes the following steps.

The first network management device sends service permission information of the target tenant and access permission information of the target tenant to an element management device, where the service permission information indicates that the first network management device has permission to invoke a first service, and the access permission information indicates that the first network device has permission to access first information. Then, after sending an access request to the element management device, the first network management device receives the first information from the element management device, where the access request includes a first information parameter, and the access request is for requesting to access, by using the first service, the first information indicated by the first information parameter.

According to this solution, a tenant having a specific network operation and maintenance capability in the network operation and maintenance architecture has permission to directly invoke some services in an EMS. In the method, the element management device in the EMS maintains the service permission information and the access permission information of the target tenant. When the target tenant has a network operation and maintenance management requirement, the first network management device in the tenant NMS of the target tenant may directly interact with the element management device in the EMS, and invoke the service in the element management device, to implement information access. Because the foregoing service invoking and information access processes are implemented through interaction between the first network management device and the element management device, and a second network management device in an operator NMS does not participate in the processes, privacy leakage is not caused in the method, and information security of a private network can be ensured.

In a possible design, the first information includes first network operation and maintenance management data and/or first network resource data.

In a possible design, the access request further includes an identifier of the target tenant.

In a possible design, before sending the access request to the element management device, the first network management device may further verify, based on the service permission information, that the first network management device has the permission to invoke the first service, and verify, based on the access permission information, that the first network management device has the permission to access the first information.

Based on the design, the first network management device performs permission verification, and then sends the access request to the element management device after the verification succeeds. This can ensure that when the element management device performs permission verification on the first network management device, the verification succeeds, thereby ensuring that the current access can succeed.

According to a third aspect, an embodiment of this application provides a communication method. The method may be applied to an element management device in an EMS in a network operation and maintenance architecture. The method includes the following steps.

The element management device obtains access permission information of a target tenant, where the access permission information indicates that a first network management device has permission to access first information, and the first network management device is located in a network management system of the target tenant, and after receiving an identifier of the target tenant and a first information parameter from a second network management device, sends, to the first network management device based on the access permission information, the identifier of the target tenant, and the first information parameter, the first information indicated by the first information parameter.

This method supports a tenant that has no permission to invoke some services in the network operation and maintenance architecture. In the method, when the target tenant has a network operation and maintenance management requirement for accessing target information, if the tenant NMS of the target tenant has no permission to invoke a target service, the tenant NMS of the target tenant may communicate and interact with the EMS through an operator NMS to invoke the target service. In addition, to ensure security of an operation result, after performing a service operation of the target service to obtain the target information, the EMS may directly send the target information to the tenant NMS of the target tenant instead of sending the target information to the operator NMS. In the method, although the service invoking and information access processes are implemented through interaction between the second network management device in the operator NMS and the element management device in the EMS, the final target information is sent by the element management device to the first network management device without passing through the second network management device. Therefore, privacy leakage is not caused in the method, and information security of a private network can be ensured.

In a possible design, the identifier of the target tenant and the first information parameter may be carried in an access request. To be specific, the element management device receives the access request from the second network management device, where the access request includes the identifier of the target tenant and the first information parameter, and the access request is for requesting, by using a first service, to access the first information indicated by the first information parameter. The first network management device has no permission to invoke the first service. The second network management device has permission to invoke the first service.

In this design, the second network management device that has the permission to invoke the first service may request, by using the access request, to invoke the first service to access the first information.

In a possible design, the element management device may further receive indication information from the second network management device, where the indication information indicates to send the first information to the first network management device.

Based on the design, the second network management device may indicate the element management device to send the first information to the first network management device, to avoid information leakage caused by forwarding the first information by the second network management device.

In a possible design, the element management device may obtain the access permission information of the target tenant in the following manner.

Manner 1: The access permission information is received from the first network management device.

Manner 2: The access permission information is received from the second network management device.

Manner 3: The preconfigured access permission information is obtained.

Based on the design, flexibility of obtaining the access permission information of the target tenant by the element management device can be improved.

In a possible design, the first information includes first network operation and maintenance management data and/or first network resource data.

In a possible design, the element management device may send, to the first network management device based on the access permission information, the identifier of the target tenant, and the first information parameter by using the following steps, the first information indicated by the first information parameter, including:

The element management device verifies, based on the identifier of the target tenant and the access permission information, that the first network management device has the permission to access the first information. Then, the element management device invokes the first service based on the first information parameter to obtain the first information. Finally, the element management device sends the first information to the first network management device.

Based on the design, the element management device may perform information access permission verification on the first network management device, invoke the first service to obtain the first information after the verification succeeds, and send the first information to the first network management device. The element management device may perform permission verification on the first network management device, to ensure security of the first information.

In a possible design, the element management device may further send an access response to the second network management device, where the access response indicates that the first service is successfully invoked.

According to a fourth aspect, an embodiment of this application provides a communication method. The method may be applied to a second network management device in an operator NMS. The method includes the following steps.

After receiving first information parameter from a first network management device, the second network management device sends an identifier of a target tenant and the first information parameter to an element management device, where the identifier of the target tenant and the first information parameter indicate the element management device to send, to the first network management device, first information indicated by the first information parameter, the first network management device is located in a network management system of the target tenant, and the first information parameter indicates the first information.

According to the method, when the target tenant has a network operation and maintenance management requirement for accessing target information, if the tenant NMS of the target tenant has no permission to invoke a target service, the tenant NMS of the target tenant may communicate and interact with an EMS through the operator NMS to invoke the target service. In addition, to ensure security of an operation result, after performing a service operation of the target service to obtain the target information, the EMS may directly send the target information to the tenant NMS of the target tenant instead of sending the target information to the operator NMS. In the method, although the service invoking and information access processes are implemented through interaction between the second network management device in the operator NMS and the element management device in the EMS, the final target information is sent by the element management device to the first network management device without passing through the second network management device. Therefore, privacy leakage is not caused in the method, and information security of a private network can be ensured.

In a possible design, the second network management device may further receive the identifier of the target tenant from the first network management device.

In a possible design, the second network management device sends an access request to the network management device, where the access request includes the identifier of the target tenant and the first information parameter, and the access request is for requesting, by using a first service, to access the first information indicated by the first information parameter. The first network management device has no permission to invoke the first service. The second network management device has permission to invoke the first service.

In this design, the second network management device that has the permission to invoke the first service may request, by using the access request, to invoke the first service to access the first information.

In a possible design, the second network management device may further send indication information to the element management device, where the indication information indicates to send the first information to the first network management device.

Based on the design, the second network management device may indicate the element management device to send the first information to the first network management device, to avoid information leakage caused by forwarding the first information by the second network management device.

In a possible design, after obtaining access permission information of the target tenant, the second network management device may further send the access permission information to the element management device, where the access permission information indicates that the first network management device has permission to access the first information.

Based on the design, the second network management device may send the access permission information of the target tenant to the element management device.

In a possible design, the second network management device may obtain the access permission information of the target tenant in the following manner.

Manner 1: The access permission information is received from the first network management device.

Manner 2: The preconfigured access permission information is obtained.

Based on the design, flexibility of obtaining the access permission information of the target tenant by the second network management device can be improved.

In a possible design, before sending the identifier of the target tenant and the first information parameter to the element management device, the second network management device may further verify, based on the access permission information, that the first network management device has the permission to access the first information.

Based on the design, the second network management device performs permission verification, and sends the identifier of the target tenant and the first information parameter to the element management device after the verification succeeds. This can ensure that when the element management device performs permission verification on the first network management device, the verification succeeds, thereby ensuring that the current access can succeed.

In a possible design, the first information includes first network operation and maintenance management data and/or first network resource data.

In a possible design, the second network management device may further receive an access response from the element management device, where the access response indicates that the first service is successfully invoked.

According to a fifth aspect, an embodiment of this application provides a communication method. The method may be applied to a first network management device in a tenant NMS of a target tenant. The method includes the following steps.

The first network management device sends a first information parameter to a second network management device, where the first information parameter indicates first information. Finally, the first network management device receives the first information from an element management device.

According to the method, when the target tenant has a network operation and maintenance management requirement for accessing target information, if the tenant NMS of the target tenant has no permission to invoke a target service, the tenant NMS of the target tenant may communicate and interact with an EMS through an operator NMS to invoke the target service. In addition, to ensure security of an operation result, after performing a service operation of the target service to obtain the target information, the EMS may directly send the target information to the tenant NMS of the target tenant instead of sending the target information to the operator NMS. In the method, although service invoking and information access processes are implemented through interaction between the second network management device in the operator NMS and the element management device in the EMS, the final target information is sent by the element management device to the first network management device without passing through the second network management device. Therefore, privacy leakage is not caused in the method, and information security of a private network can be ensured.

In a possible design, the first network management device may further send an identifier of the target tenant to the first network management device.

In a possible design, after obtaining access permission information of the target tenant, the first network management device may further send the access permission information to the second network management device, where the access permission information indicates that the first network management device has permission to access the first information.

In a possible design, the first network management device may obtain the preconfigured access permission information.

In a possible design, before sending the first information parameter to the second network management device, the first network management device may further verify, based on the access permission information, that the first network management device has the permission to access the first information.

Based on the design, the first network management device performs permission verification and sends the first information parameter to the second network management device after the verification succeeds. This can ensure that when the second network management device and the element management device perform permission verification on the first network management device, the verification succeeds, thereby ensuring that the current access can succeed.

In a possible design, the first information includes first network operation and maintenance management data and/or first network resource data.

According to a sixth aspect, an embodiment of this application provides a communication apparatus, including a unit configured to perform steps in the first aspect to the sixth aspect.

According to a seventh aspect, an embodiment of this application provides a communication device, including at least one processing element and at least one storage element, where the at least one storage element is configured to store a program and data, and the at least one processing element is configured to perform the method provided in the first aspect to the sixth aspect of this application.

According to an eighth aspect, an embodiment of this application further provides a communication system, including an element management device configured to perform the method provided in the first aspect of this application and a first network management device configured to perform the method provided in the second aspect of this application.

According to a ninth aspect, an embodiment of this application further provides a communication system, including an element management device configured to perform the method provided in the third aspect of this application, a second network management device configured to perform the method provided in the fourth aspect of this application, and a first network management device configured to perform the method provided in the fifth aspect of this application.

According to a tenth aspect, an embodiment of this application further provides a computer program. When the computer program is run on a computer, the computer is enabled to perform the method provided in any one of the foregoing aspects.

According to an eleventh aspect, an embodiment of this application further provides a computer storage medium. The computer storage medium stores a computer program. When the computer program is executed by a computer, the computer is enabled to perform the method provided in any one of the foregoing aspects.

According to a twelfth aspect, an embodiment of this application further provides a chip. The chip is configured to read a computer program stored in a memory, to perform the method provided in any one of the foregoing aspects.

According to a thirteenth aspect, an embodiment of this application further provides a chip system. The chip system includes a processor, configured to support a computer apparatus in implementing the method provided in any one of the foregoing aspects. In a possible design, the chip system further includes a memory, and the memory is configured to store a program and data that are necessary for the computer apparatus. The chip system may include a chip, or may include a chip and another discrete device.

DETAILED DESCRIPTION OF ILLUSTRATIVE EMBODIMENTS

Figure 1:
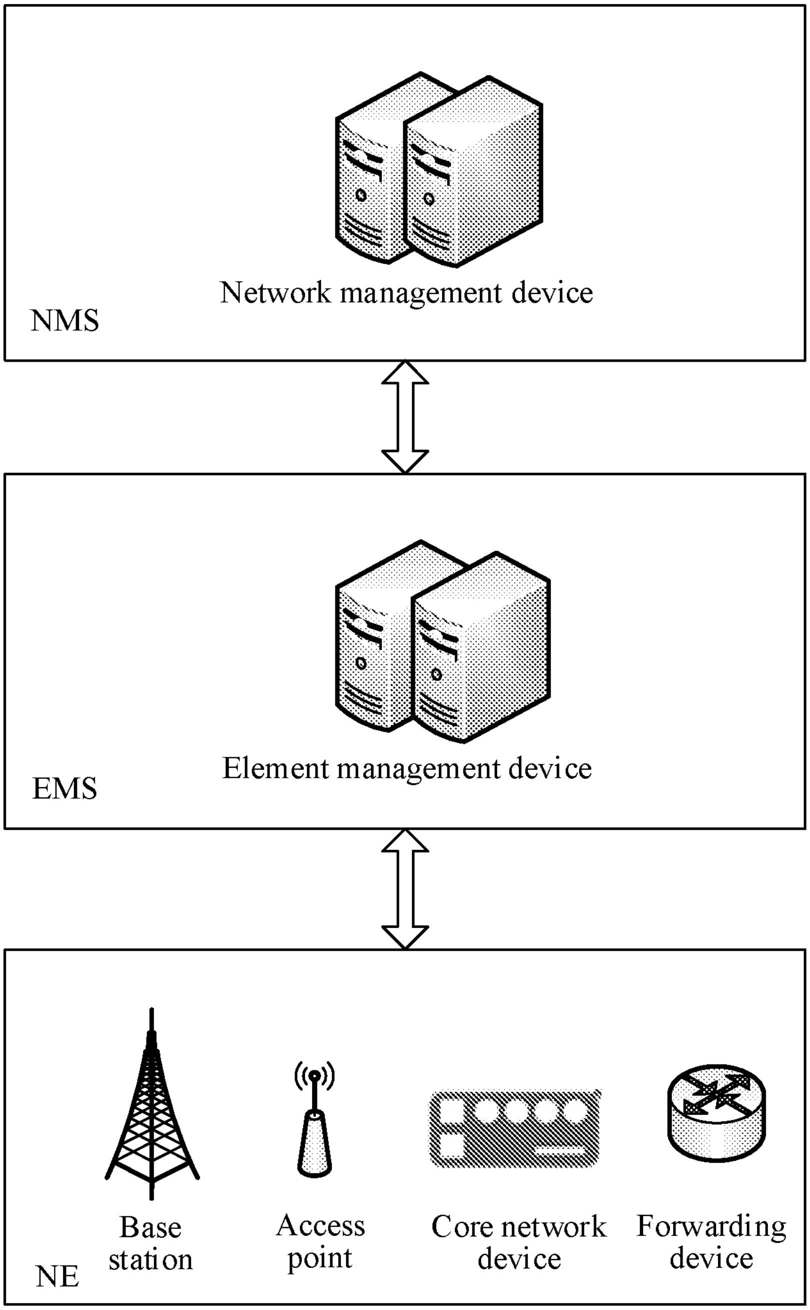
FIG. 1 is a schematic diagram of a conventional network operation and maintenance architecture.

This application provides a communication method, apparatus, and device, to ensure information security of a private network in a network operation and maintenance architecture. The method, the apparatus, and the device are based on a same technical concept. Because the method, the apparatus, and the device have a similar problem-resolving principle, for implementations of the apparatus, the device, and the method, mutual reference may be made, and repeated parts are not described again.

In the following, some terms in this application are described, to help a person skilled in the art have a better understanding.

(1) An organization is a social organization that has a networking capability and can deploy a private network. Optionally, a form of the organization may be an enterprise, a company, an industry, or the like. This is not limited in this application.

In embodiments of this application, only an example in which the organization is a vertical industry is used for description.

In a network operation and maintenance architecture, if the organization chooses to rent a network operation and maintenance management service of an operator NMS to implement network operation and maintenance management of the private network of the organization, the organization may also be referred to as a tenant, a user, a customer, or the like.

In subsequent embodiments and descriptions of this application, only the tenant is used as an example for description.

(2) An NE is a basic element of a network and is also referred to as a network device. A representation form of the NE is not limited in embodiments of this application. Optionally, the NE may include but is not limited to a base station, an access point, a core network device, a forwarding device (a switch, a router, or the like), a gateway, and the like. It should be further noted that the NE may be a physical entity device, may be a virtualized network function (VNF), or may be a virtual container (VC).

(3) An EMS is a core part of the network operation and maintenance architecture, is configured to manage an NE in a private network of each tenant, and may further provide various network operation and maintenance management services. Specifically, the EMS may invoke a corresponding service based on a service invoking request of an NMS, to perform a service operation to obtain an operation result (various data information), and feed back, by using the NMS, the obtained operation result to an organization that has a network operation and maintenance management requirement.

The EMS may include at least one element management device, configured to implement a function of the EMS.

(4) The NMS is configured to invoke, based on a network operation and maintenance management requirement of the tenant, a network operation and maintenance management service that is in the EMS and that meets the network operation and maintenance management requirement, obtain an operation result (various data information) returned by the EMS, and feed back the operation result to the tenant.

Based on different division of management permission and roles, in this application, the NMS may be classified into two types: an operator NMS and a tenant NMS.

The operator NMS is deployed and managed by an operator. Usually, the operator NMS has permission to invoke all network operation and maintenance management services in the EMS.

The tenant NMS is deployed and managed by the tenant. The tenant NMS has permission to invoke some network operation and maintenance management services in the EMS, or has no permission to invoke any network operation and maintenance management service. For example, the operator may pre-negotiate with the tenant, and grant the tenant permission to invoke some network operation and maintenance management services. For another example, if no pre-negotiation is performed with the operator, or in a negotiation process, the operator does not grant the tenant permission to invoke any network operation and maintenance management service, the tenant NMS has no permission to invoke any network operation and maintenance management service.

It should be noted that because the tenant NMS is deployed and managed by the tenant, in the network operation and maintenance architecture, an identity of the tenant NMS is equivalent to that of the tenant. In other words, service permission information and access permission information of the tenant are equivalent to service permission information and access permission information of the tenant NMS (or a network management device in the tenant NMS).

Optionally, a process in which the operator and the tenant pre-negotiate the permission to invoke the network operation and maintenance management service may be performed offline, to obtain a negotiation result, that is, the service permission information of the tenant. In addition, the operator and the tenant may further perform the process online, that is, the tenant NMS and the operator NMS interact with each other, to obtain a negotiation result, that is, the service permission information of the tenant. In addition, the operator NMS or the tenant NMS may separately store the service permission information of the tenant. Optionally, the service permission information of the tenant may be further stored in the EMS.

When a first target service needs to be invoked based on the network operation and maintenance management requirement of the tenant, if the tenant NMS has permission to invoke the first target service, the tenant NMS may interact with the EMS to invoke the first target service in the EMS, and receive, from the EMS, a first operation result obtained by performing a service operation of the first target service.

When a second target service needs to be invoked based on the network operation and maintenance management requirement of the tenant, if the tenant NMS has no permission to invoke the second target service, the tenant NMS needs to invoke the second target service in the EMS through the operator NMS, and then the tenant NMS may receive, from the EMS, a second operation result obtained by performing a service operation of the second target service.

The NMS may include at least one network management device, configured to implement a function of the EMS. For differentiation, in embodiments of this application, a network management device located in the tenant NMS is referred to as a first network management device, and a network management device located in the operator NMS is referred to as a second network management device.

(5) The network operation and maintenance management service (MnS) is a series of resources in the EMS to implement a network operation and maintenance management function, including a computing resource, a software resource, a data resource, a hardware resource, and the like.

For example, the network operation and maintenance management service provided by the EMS may include but is not limited to the following:

Service (GetMOIAttributes) for obtaining a management object instance parameter: When the EMS performs network operation and maintenance management, a management object instance (MOI) represents a network resource. This service helps the NMS access the network resource and obtain network resource data.

Service (GetAlarmList) for obtaining alarm information: The service can help the NMS obtain some alarm data on the network.

Service (GetMeasureReport) for obtaining performance data: The service may help the NMS obtain some performance data on the network.

Optionally, different network operation and maintenance management services may be invoked through different service invoking interfaces. To be specific, in this application, there may be a plurality of service invoking interfaces between the EMS and the NMS. When the NMS needs to invoke the first target service, the NMS may invoke the first target service in the EMS through a service invoking interface corresponding to the first target service.

The service invoking interface may specify at least one of the following content: a message type, a message format, carried data, and the like. When receiving a service invoking request message, the EMS may determine, by using the foregoing content in the message, a service invoking interface through which the message is sent, and further may determine a service that the message is for invoking.

(6) Network operation and maintenance management information includes network operation and maintenance management data and/or the network resource data in the private network of the tenant.

The network operation and maintenance management data may include but is not limited to the following types of data:

Network configuration management (CM) data, for example, network configuration management information (network resource management (NRM) management object (MO)): The NMS may invoke, to obtain the type of data, the service (GetMOIAttributes) that is in the EMS and that is for obtaining the management object instance parameter.

Network fault management (FM) data, for example, network alarm data: The NMS may invoke, to obtain the type of data, the service (GetAlarmList) for obtaining the alarm information.

Network performance management (PM) data, for example, a network performance report: The NMS may invoke, to obtain the type of data, the service (GetMeasureReport) for obtaining the performance data.

The network resource is a network resource allocated to the private network for use, and may include but is not limited to a physical network element (for example, a PNF), a virtualized network function (for example, a VNF), a container network element (for example, a CNF), and the like. The network resource data, for example, a usage rate of the network resource or an idle amount of the network resource, may be obtained by invoking a service for accessing the network resource.

It should be noted that, when invoking a target network operation and maintenance management service based on the network operation and maintenance management requirement of the tenant, the NMS further needs to determine an information parameter of to-be-accessed target information based on the network operation and maintenance management requirement, so that the EMS may invoke the target network operation and maintenance management service based on the information parameter, to accurately obtain the target information.

For example, when the tenant needs to obtain the network alarm data, the NMS needs to invoke the service (GetAlarmList) that is in the EMS and that is for obtaining the alarm information, and needs to set information parameters shown in the first row of the following Table 1.

TABLE 1

| Parameter name | Translation | Description |
|---|---|---|
| AlarmAckState | Alarm status | Status of the alarm data to be obtained. If the value is Active, it indicates that the tenant wants to obtain alarm data in an Active state. |
| BaseObjectClass | Basic object class | Management object class for which the alarm data is to be obtained. If the value is NRCellCU, it indicates that a current operation object that invokes GetAlarmList to perform a service operation is an NRCellCU instance. |
| BaseObjectInstance | Basic object instance | Management object instance for which the alarm data is to be obtained, which is an instance ID of an operation object. For example, if the parameter is 12345 and is combined with the BaseObjectClass parameter, it indicates that a current operation object that invokes GetAlarmList to perform a service operation is an NRCellCU instance whose ID is 12345. |
| filter | Filtering condition | Conditions needing to be met by the alarm data to be obtained, for example, a type and generation time of the alarm data. For example, if the parameter is Communication, it indicates that the tenant wants to access alarm data of a Communication type. |

(7) The term "and/or" describes an association relationship between associated objects and represents that three relationships may exist. For example, A and/or B may represent the following three cases: Only A exists, both A and B exist, and only B exists. The character "/" usually indicates an "or" relationship between the associated objects.

It should be noted that "a plurality of" in this application means two or more. At least one means one or more.

In addition, it should be understood that in descriptions of this application, terms such as "first" and "second" are merely for distinguishing and description, but cannot be understood as indicating or implying relative importance, or cannot be understood as indicating or implying a sequence.

The following describes embodiments of this application in detail with reference to accompanying drawings.

Figure 2:
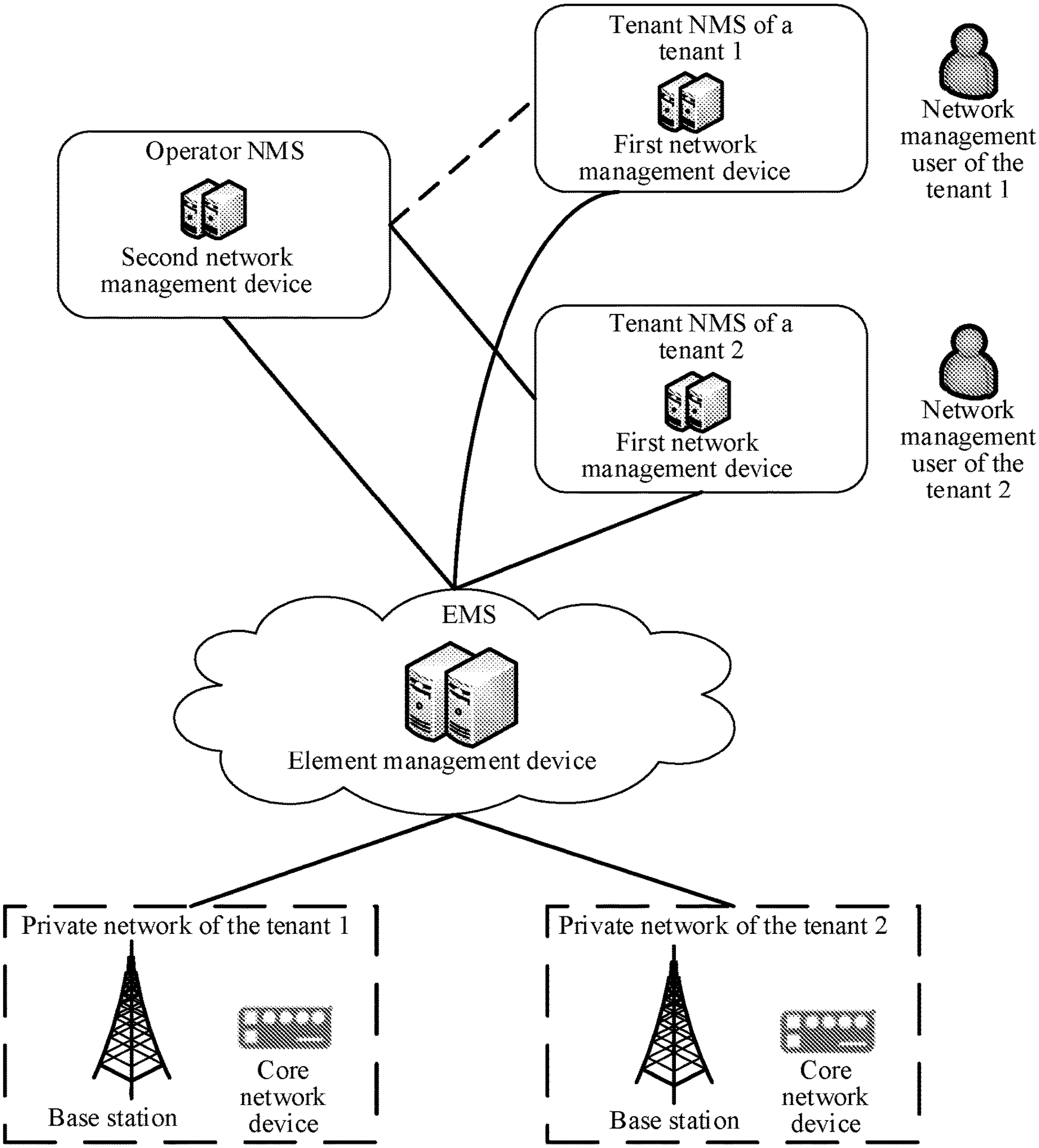
FIG. 2 is a schematic diagram of a network operation and maintenance architecture according to an embodiment of this application.

FIG. 2 is a schematic diagram of a network operation and maintenance architecture to which a communication method is applicable according to an embodiment of this application. Refer to FIG. 2. The architecture includes a tenant NMS, an operator NMS, an EMS, and a private network of at least one tenant.

The tenant NMS is deployed and managed by a tenant, for example, a tenant NMS of a tenant 1 and a tenant NMS of a tenant 2 in the figure. By default, the tenant NMS has no permission to invoke any network operation and maintenance management service in the EMS. However, the tenant NMS may obtain, based on a pre-negotiated negotiation result (service permission information of the tenant) between the tenant and an operator, permission to invoke some network operation and maintenance management services in the EMS.

For example, the tenant 1 may obtain a negotiation result, that is, service permission information of the tenant 1, through offline negotiation with the operator. Then, a network management user of the tenant 1 may store the service permission information of the tenant 1 to the tenant NMS of the tenant 1. A network management user of the operator may alternatively store the service permission information of the tenant 1 to the operator NMS. Optionally, the operator NMS or the tenant NMS of the tenant 1 may further send the stored service permission information of the tenant 1 to the EMS, so that service permission verification is performed on the tenant NMS of the tenant 1 when the tenant NMS of the tenant 1 subsequently invokes a related service.

For another example, a pre-negotiation process between the tenant 1 and the operator may alternatively be performed online. To be specific, the tenant NMS and the operator NMS may interact to obtain a negotiation result, that is, the service permission information of the tenant 1. Then, the tenant NMS of the tenant 1 may store the service permission information of the tenant 1 by itself. The operator NMS may alternatively store the service permission information of the tenant 1 by itself. Optionally, the operator NMS or the tenant NMS of the tenant 1 may further send the stored service permission information of the tenant 1 to the EMS, so that service permission verification is performed on the tenant NMS of the tenant 1 when the tenant NMS of the tenant 1 subsequently invokes a related service.

For another example, when the tenant 2 rents the operator NMS in a full hosting manner to perform network operation and maintenance management on a private network of the tenant 2, the tenant 2 (that is, the tenant NMS of the tenant 2) has no permission to invoke any network operation and maintenance management service. For another example, when the tenant 2 performs service permission negotiation with the operator, the negotiation fails, and no negotiation result is obtained. In this case, the tenant 2 (that is, the tenant NMS of the tenant 2) also has no permission to invoke any network operation and maintenance management service.

It should be further noted that in this embodiment of this application, when the tenant negotiates with the operator about permission of the tenant to access information, refer to the foregoing process of negotiating the permission of invoking the service. Details are not described herein again.

When a target tenant has a network operation and maintenance management requirement for invoking a target service and accessing target information, if a tenant NMS of the target tenant has permission to invoke the target service, the tenant NMS of the target tenant may communicate and interact with the EMS to invoke the target service. After the EMS performs a service operation of the target service to obtain an operation result (target information), the NMS of the target tenant may receive the operation result from the EMS.

When the target tenant has the network operation and maintenance management requirement for invoking the target service and accessing the target information, if the tenant NMS of the target tenant has no permission to invoke the target service, the tenant NMS of the target tenant needs to send the network operation and maintenance management requirement to the operator NMS, and the operator NMS communicates and interacts with the EMS to invoke the target service. In addition, to ensure security of the operation result, after performing the service operation of the target service to obtain the operation result (target information), the EMS may directly send the operation result to the tenant NMS of the target tenant instead of sending the operation result to the operator NMS.

The operator NMS is deployed and managed by the operator, and usually has permission to invoke all network operation and maintenance management services in the EMS. In addition, the operator NMS has a function, for example, managing service invoking permission and information access permission of the tenant.

The EMS is an important part in the network operation and maintenance architecture, and is configured to perform operation and maintenance management on an NE in a private network of each tenant, and provide various network operation and maintenance management services for the operator NMS and the tenant NMS. To ensure security of the target information that the target tenant requests to access, after performing the service operation of the target service, the EMS directly feeds back the obtained operation result (that is, the target information) to the tenant NMS of the target tenant.

It should be noted that, in the network operation and maintenance architecture shown in FIG. 2, different devices interact with each other through corresponding communication interfaces.

A service proxy interface exists between the tenant NMS and the operator NMS. When the target tenant has the network operation and maintenance management requirement for invoking the target service and accessing the target information, but the tenant NMS of the target tenant has no permission to invoke the target service, the target tenant may send the network operation and maintenance management requirement to the operator NMS through the service proxy interface, to entrust the operator to invoke the target service in the EMS.

When the target tenant has the permission to invoke the target service in the EMS, a service invoking interface of the target service exists between the tenant NMS of the target tenant and the EMS. The tenant NMS of the target tenant and the EMS may invoke the target service through the service invoking interface of the target service based on an identifier of the target tenant.

A service invoking interface corresponding to each network operation and maintenance management service exists between the operator NMS and the EMS. In this way, when the operator NMS invokes any network operation and maintenance management service, the invoking may be implemented through a corresponding service invoking interface.

In addition, a tenant management interface may further exist between the operator NMS and the EMS, and is configured to manage and maintain the information access permission of the tenant.

It should be further noted that FIG. 2 is used as an example of a network operation and maintenance architecture, and does not constitute any limitation on the network operation and maintenance architecture to which the communication method is applicable according to this embodiment of this application. In actual application, there may be more private networks of the tenant in the architecture. In addition, some network resources may be shared between private networks of different tenants, between the private network of the tenant and the operator NMS, between the operator NMS and the EMS, and between the private network of the tenant and the EMS. For example, some core network devices may be shared between the private network of the tenant 2 and the operator NMS.

In addition, names of systems in FIG. 2 and names of devices in the system are not limited in this embodiment of this application. Based on logical function division, a first network management device located in the tenant NMS may also be referred to as a tenant service invoking module. A second network management device located in the operator NMS may also be referred to as an operator service invoking module. An element management device in the EMS may further be divided into a tenant management module and a service providing module.

An embodiment of this application provides a communication method. The method may be applied to the network operation and maintenance architecture shown in FIG. 2. The following uses a target tenant as an example to specifically describe steps of the method by referring to a flowchart shown in FIG. 3.

S300: After negotiating with an operator about permission of the target tenant to invoke a service, the target tenant determines service permission information of the target tenant. The target tenant negotiates with the operator about permission of the target tenant to access information, and determines access permission information of the target tenant.

Because a tenant NMS is deployed and managed by a tenant, in the network operation and maintenance architecture shown in FIG. 2, an identity of the tenant NMS is equivalent to that of the tenant. In other words, service permission information and access permission information of the tenant are equivalent to service permission information and access permission information of the tenant NMS (or a network management device in the tenant NMS).

Therefore, in S300, the service permission information of the target tenant indicates that a tenant NMS (a first network management device in the tenant NMS) of the target tenant has permission to invoke at least one type of service (which is referred to as an authorization service for short below). The access permission information of the target tenant indicates that the first network management device has permission to access at least one type of information (which may be referred to as authorization information for short below).

The authorization service includes at least one type of network operation and maintenance management service in an EMS, and the target service includes a first service. The authorization information is at least one type of information in a private network of the target tenant, and the target information includes first information. The authorization information may include at least one type of network operation and maintenance management data and/or at least one type of network resource data.

It should be further noted that in S300, the target tenant and the operator may negotiate, in an offline negotiation manner or an online negotiation manner, the permission of the target tenant to invoke the service and/or the permission to access the information.

In the offline negotiation manner, a network management user of the operator may store a negotiation result (the service permission information and/or the access permission information of the target tenant) to a second network management device in an operator NMS. Alternatively, a network management user of the target tenant may store the negotiation result (the service permission information and/or the access permission information of the target tenant) to a first network management device in the tenant NMS of the target tenant.

In the online negotiation manner, the second network management device in the operator NMS communicates and interacts with the first network management device in the tenant NMS of the target tenant, to implement a negotiation process. After the negotiation ends, the second network management device in the operator NMS may directly store the negotiation result (the service permission information and/or the access permission information of the target tenant). Alternatively, the first network management device in the tenant NMS of the target tenant may directly store the negotiation result (the service permission information and/or the access permission information of the target tenant).

After the target tenant negotiates with the operator about the permission of the target tenant to invoke the service and/or the permission to access the information, the second network management device in the operator NMS and/or the first network management device in the tenant NMS of the target tenant may alternatively send the negotiation result to the EMS. Alternatively, a network management user of the EMS enters the negotiation result to an element management device in the EMS. In this way, the element management device in the EMS may perform permission verification on the first network management device in the NMS of the target tenant subsequently.

S301: The element management device in the EMS obtains the service permission information of the target tenant.

Optionally, the element management device may obtain the service permission information in, but not limited to, the following three manners.

Manner 1: When the service permission information is stored in the first network management device in the tenant NMS of the target tenant, the element management device may receive the service permission information from the first network management device.

Manner 2: When the service permission information is stored in the second network management device in the operator NMS, the element management device may receive the service permission information from the second network management device.

Manner 3: When the service permission information is preconfigured in the EMS, the element management device obtains the preconfigured service permission information.

S302: The element management device obtains the access permission information of the target tenant.

Optionally, the element management device may obtain the access permission information in, but not limited to, the following three manners.

Manner 1: When the access permission information is stored in the first network management device in the tenant NMS of the target tenant, the element management device may receive the access permission information from the first network management device.

Manner 2: When the access permission information is stored in the second network management device in the operator NMS, the element management device may receive the access permission information from the second network management device.

Manner 3: When the access permission information is preconfigured in the element management device, the element management device obtains the preconfigured access permission information.

It should be noted that a sequence of performing S301 and S302 is not limited in this application. For example, the element management device may perform S301 and S302 simultaneously, or perform S301 before S302, or perform S302 before S301.

It should be further noted that, in this embodiment of this application, the element management device may trigger execution of S301 and S302 in a plurality of trigger manners. For example, the first network management device or the second network management device may send a management request to the element management device, where the management request is for requesting to manage the service permission information and the access permission information of the target tenant. After the element management device receives the management request, S301 and S302 are performed based on the management request. Optionally, the management request may carry the service permission information and/or the access permission information of the target tenant. In addition, the management request may further carry an identifier of the target tenant.

In a possible implementation, the element management device may maintain the service permission information and the access permission information of the target tenant in the following manner.

The element management device internally maintains a tenant object model and a tenant permission object model associated with the tenant object model. The tenant permission object model includes a service permission information variable (a first variable for short) of the tenant and an access permission information variable (a second variable for short) of the tenant.

After performing S301 and S302, the element management device may instantiate the tenant object model for the target tenant to create a target tenant object instance, and instantiate the tenant permission object model for the target tenant based on the service permission information and the access permission information of the target tenant, that is, assign values to the first variable and the second variable in the tenant permission object model, to create a target tenant permission object instance.

The target tenant object instance is for describing the target tenant. The target tenant permission object instance is associated with the tenant object instance, and is for describing the service permission information and the access permission information of the target tenant.

Optionally, the element management device may represent the tenant object model by using a tenant object class, and represent the tenant permission object model by using a tenant permission (TenantPermission) object class. In addition, the tenant permission (TenantPermission) object class has a plurality of member variables: a service invoking permission (ServiceInvokingPermission) variable, a data access permission (DataAccessPermission) variable, and a network resource access permission (ResourceAccessPermission) variable. Structures of the tenant object class and the tenant permission (TenantPermission) object class may be shown in FIG. 4.

The service invoking permission (ServiceInvokingPermission) variable is the service permission information variable (first variable) of the tenant. The data access permission (DataAccessPermission) variable and the network resource access permission (ResourceAccessPermission) variable are the access permission information variable (second variable) of the tenant.

When the element management device creates the target tenant object instance, the creation may be implemented by creating an object of the tenant object class. When the element management device creates the target tenant permission object instance, the creation may be implemented by creating an object of the tenant permission (TenantPermission) object class. Values of variables in the object of the tenant permission (TenantPermission) object class are set based on the service permission information and the access permission information of the target tenant.

A value of the service invoking permission (ServiceInvokingPermission) variable is determined based on the service permission information of the target tenant, and the value of the service invoking permission variable may be an authorization service indicated by the service permission information.

A value of the data access permission (DataAccessPermission) variable and a value of the network resource access permission (ResourceAccessPermission) variable are determined based on the access permission information of the target tenant. The value of the data access permission (DataAccessPermission) variable may be at least one type of network operation and maintenance management data included in the authorization information indicated by the access permission information. The value of the network resource access permission (ResourceAccessPermission) variable may be at least one type of network resource data included in the authorization information indicated by the access permission information.

For example, the value of the service invoking permission (ServiceInvokingPermission) variable indicates a service that can be invoked by the target tenant. For example:

The service invoking permission (ServiceInvokingPermission) variable includes a service for obtaining a management object instance parameter, that is, 'CMpermission': ['GetMOIAttributes'], indicating that the target tenant can invoke a configuration management CM-related service for obtaining the MOI parameter.

The service invoking permission (ServiceInvokingPermission) variable includes a service for obtaining alarm information, that is, 'FMpermission':['GetAlarmList'], indicating that the target tenant can invoke a fault management FM-related service for obtaining the alarm information.

The service invoking permission (ServiceInvokingPermission) variable includes a service for obtaining performance data, that is, 'PMpermission':['GetMeasurementReport'], indicating that the target tenant can invoke a performance management PM-related service for accessing a performance measurement report.

For example, the value of the data access permission (DataAccessPermission) variable indicates network operation and maintenance management data that can be accessed by the target tenant. For example:

The data access permission (DataAccessPermission) variable includes network performance management data, that is, 'PMkpi:['PacketDelay', 'RadioResourceUtilization'], indicating that the target tenant can access the network performance management data related to a data packet delay and radio resource utilization.

The data access permission (DataAccessPermission) variable includes network alarm data, that is, 'AlarmType': ['Communications Alarm', 'Processing Error Alarm'], indicating that the target tenant can access fault management data related to communication alarm data and processing error alarm.

For example, the value of the network resource access permission (ResourceAccessPermission) variable indicates network resource data that can be accessed by the target tenant. For example:

The network resource access permission (ResourceAccessPermission) variable includes a resource management object type, that is, 'MOtype':['NRCellDU'], indicating that the target tenant can access network resource data representing a cell NRCellDU type instance.

S303: When the target tenant has a network operation and maintenance management requirement for accessing the first information by invoking the first service, the first network management device in the tenant NMS of the target tenant performs permission verification, and the verification succeeds.

The first information may include first network operation and maintenance management data and/or first network resource data.

It should be noted that this step is an optional step, and the first network management device may not perform permission verification, that is, perform S304. Performing the step can ensure that the first network management device sends an access request to the EMS when having permission to invoke the first service and having permission to access the first information.

In an implementation, in a process of performing S303, when the first network management device stores the service permission information of the target tenant, the first network management device may verify, based on the service permission information, that the first network management device has the permission to invoke the first service, that is, determine that the authorization service indicated by the service permission information includes the first service.

In an implementation, in a process of performing S303, when the first network management device stores the access permission information of the target tenant, the first network management device may verify, based on the access permission information, that the first network management device has the permission to access the first information, that is, determine that the authorization information indicated by the access permission information includes the first information.

The first network management device performs permission verification, and then sends the access request to the element management device after the verification succeeds.

This can ensure that when the element management device performs permission verification on the first network management device, the verification succeeds, thereby ensuring that the current access can succeed.

S304: The first network management device sends the access request to the element management device, and the element management device receives the access request from the first network management device. The access request includes a first information parameter. The first information parameter indicates the first information. The access request is for requesting to access, by using the first service, the first information indicated by the first information parameter.

The access request is transmitted through a service invoking interface that corresponds to the first service and that is between the first network management device and the element management device. Therefore, the access request may be carried in a service invoking request message, and the service invoking request message meets a specification of the service invoking interface corresponding to the first service on a type, a format, and data content of a message.

In an implementation, to identify that the current access is initiated by the target tenant or initiated by the tenant NMS of the target tenant, the access request may further include the identifier of the target tenant.

The identifier of the target tenant may be any information that can uniquely identify the target tenant, for example, an identifier of the tenant NMS of the target tenant, an identifier of the first network management device in the tenant NMS of the target tenant, an account of the target tenant, a name of the target tenant, and a signing contract identifier of the target tenant.

It can be learned from the foregoing explanations and descriptions of network operation and maintenance management information that, to access each type of data, a parameter of the type of data needs to be set, for example, as shown in Table 1. Therefore, in this embodiment of this application, the first information parameter is a parameter of the first information, and indicates the first information.

For example, the target tenant wants to access the data of the Communications Alarm type in the private network of the target tenant. The first network management device in the tenant NMS of the target tenant determines that the first network management device has permission to access the data of the Communications Alarm type and also has permission to invoke the service (GetAlarmList) for obtaining the alarm information. Therefore, the first network management device performs permission verification on the first network management device, and the verification succeeds. In this case, the first network management device may directly send an access request to the element management device in the EMS, and request to invoke the service (GetAlarmList) for obtaining the alarm information to access the data of the Communications Alarm type. The access request may carry the identifier of the target tenant and parameters (the parameters describe resources and data that need to be accessed by using the service) of the to-be-accessed data of the Communications Alarm type.

S305: The element management device obtains the first information based on the service permission information, the access permission information, and the first information parameter.

In an implementation, when performing S305, the element management device may first perform permission verification on the first network management device, and after the verification succeeds, invoke the first service to obtain the first information. This may specifically include the following steps.

The element management device verifies, based on the service permission information, that the first network management device has the permission to invoke the first service.

The element management device verifies, based on the access permission information, that the first network management device has the permission to access the first information.

The element management device invokes the first service based on the first information parameter, and performs a service operation of the first service, to obtain the first information indicated by the first information parameter.

S306: The element management device sends the first information to the first network management device, and the first network management device receives the first information from the element management device.

Optionally, corresponding to the access request, the element management device sends an access response to the first network management device, where the access response includes the first information. Optionally, the access response may further indicate that the first service is successfully invoked. In addition, the access response may further include the identifier of the target tenant.

In an implementation, when the first information is carried in the access response, the element management device may transmit the access response through the service invoking interface corresponding to the first service. In this case, the access response may be carried in a service invoking response message, and the service invoking response message meets the specification of the service invoking interface corresponding to the first service on the type, the format, and the data content of the message.

In another implementation, when the element management device does not send the first information by using the access response, the element management device may transmit the first information through a data transmission interface between the element management device and the first network management device. Optionally, the element management device may alternatively encrypt the first information when transmitting the first information. Correspondingly, when receiving the encrypted first information, the first network management device further needs to perform decryption to obtain the first information.

In conclusion, this embodiment of this application provides a communication method. According to this solution, a tenant having a specific network operation and maintenance capability in the network operation and maintenance architecture has permission to directly invoke some services in the EMS. In the method, the element management device in the EMS maintains the service permission information and the access permission information of the target tenant. When the target tenant has the network operation and maintenance management requirement, the first network management device in the tenant NMS of the target tenant may directly interact with the element management device in the EMS, and invoke the service in the element management device, to implement information access. Because the foregoing service invoking and information access processes are implemented through interaction between the first network management device and the element management device, and the second network management device in the operator NMS does not participate in the processes, privacy leakage is not caused in the method, and information security can be ensured. In conclusion, the method can ensure information security of the private network in the network operation and maintenance architecture.

An embodiment of this application provides a communication method. The method may be applied to the network operation and maintenance architecture shown in FIG. 2. The following uses a target tenant as an example to specifically describe steps of the method by referring to a flowchart shown in FIG. 5.

S500: The target tenant negotiates with an operator about permission of the target tenant to access information, and determines access permission information of the target tenant.

Because a tenant NMS is deployed and managed by a tenant, in the network operation and maintenance architecture shown in FIG. 2, an identity of the tenant NMS is equivalent to that of the tenant. In other words, access permission information of the tenant is equivalent to access permission information of the tenant NMS (or a network management device in the tenant NMS).

Therefore, in S500, the access permission information of the target tenant indicates that a first network management device has permission to access at least one type of information (which may be referred to as authorization information for short below).

The authorization information is at least one type of information in a private network of the target tenant, and the target information includes first information. The authorization information may include at least one type of network operation and maintenance management data and/or at least one type of network resource data.

It should be further noted that in S500, the target tenant and the operator may negotiate, in an offline negotiation manner or an online negotiation manner, the permission of the target tenant to access the information.

In the offline negotiation manner, a network management user of the operator may store a negotiation result (the access permission information of the target tenant) to a second network management device in an operator NMS. Alternatively, a network management user of the target tenant may store the negotiation result (the access permission information of the target tenant) to the first network management device in the tenant NMS of the target tenant.

In the online negotiation manner, the second network management device in the operator NMS communicates and interacts with the first network management device in the tenant NMS of the target tenant, to implement a negotiation process. After the negotiation ends, the second network management device in the operator NMS may directly store the negotiation result (the access permission information of the target tenant). Alternatively, the first network management device in the tenant NMS of the target tenant may directly store the negotiation result (the access permission information of the target tenant).

After the target tenant negotiates with the operator about the permission of the target tenant to access the information, the second network management device in the operator NMS and/or the first network management device in the tenant NMS of the target tenant may alternatively send the negotiation result to an EMS. Alternatively, a network management user of the EMS enters the negotiation result to an element management device in the EMS. In this way, the element management device in the EMS may perform permission verification on the first network management device in the NMS of the target tenant subsequently.

S501: The element management device obtains the access permission information of the target tenant.

Optionally, the element management device may obtain the access permission information in, but not limited to, the following three manners.

Manner 1: When the access permission information is stored in the first network management device in the tenant NMS of the target tenant, the element management device may receive the access permission information from the first network management device.

Manner 2: When the access permission information is stored in the second network management device in the operator NMS, the element management device may receive the access permission information from the second network management device.

Manner 3: When the access permission information is preconfigured in the element management device, the element management device obtains the preconfigured access permission information.

It should be further noted that, in this embodiment of this application, the element management device may trigger execution of S501 in a plurality of trigger manners. For example, the first network management device or the second network management device may send a management request to the element management device, where the management request is for requesting to manage the access permission information of the target tenant. After the element management device receives the management request, S501 is performed based on the management request. Optionally, the management request may carry the access permission information of the target tenant. In addition, the management request may further carry an identifier of the target tenant.

In a possible implementation, the element management device may maintain the access permission information of the target tenant in the following manner.

The element management device internally maintains a tenant object model and a tenant permission object model associated with the tenant object model. The tenant permission object model includes an access permission information variable of the tenant. Certainly, to save storage space, the tenant permission object model in this embodiment of this application may be a same model as the tenant permission object model that is set for the tenant having service permission information in the embodiment shown in FIG. 3. To be specific, the tenant permission object model may further include service permission information of the tenant.

After performing S501, the element management device may instantiate the tenant object model for the target tenant to create a target tenant object instance, and instantiate the tenant permission model for the target tenant based on the access permission information of the target tenant, that is, assign a value to the access permission information variable of the tenant in the tenant permission model, to create a target tenant permission object instance.

The target tenant object instance is for describing the target tenant. The target tenant permission object instance is associated with the tenant object instance, and is for describing the access permission information of the target tenant.

Optionally, the element management device may represent the tenant object model by using a tenant object class, and represent the tenant permission object model by using a tenant permission (TenantPermission) object class. In addition, the tenant permission (TenantPermission) object class has a plurality of member variables: a service invoking permission (ServiceInvokingPermission) variable (optional), a data access permission (DataAccessPermission) variable, and a network resource access permission (ResourceAccessPermission) variable. Structures of the tenant object class and the tenant permission (TenantPermission) object class may be shown in FIG. 4. For details, refer to the descriptions in the embodiment shown in FIG. 3. Details are not described herein again.

S502: When the target tenant has a network operation and maintenance management requirement for accessing the first information, the first network management device in the tenant NMS of the target tenant performs permission verification, and the verification succeeds.

The first information may include first network operation and maintenance management data and/or first network resource data.

It should be noted that this step is an optional step, and the first network management device may not perform permission verification, that is, perform S503. Performing the step can ensure that the first network management device sends information (that is, a first information parameter) about the current network operation and maintenance management requirement to the second network management device in the operator NMS when the first network management device has permission to access the first information.

In an implementation, in a process of performing S502, when the first network management device stores the access permission information of the target tenant, the first network management device may verify, based on the access permission information, that the first network management device has the permission to access the first information, that is, determine that the authorization information indicated by the access permission information includes the first information.

Optionally, when the first network management device determines that the first service needs to be invoked to access the first information, the first network device may further verify that the first network device has no permission to invoke the first service. For example, when the first network management device pre-negotiates the permission of the target tenant to invoke the service, the first network management device may verify that an authorization service indicated by the service permission information of the target tenant does not include the first service.

The first network management device performs permission verification, and sends the information (that is, the first information parameter) about the current network operation and maintenance management requirement to the second network management device after the verification succeeds. This can ensure that when the second network management device or the element management device performs permission verification on the first network management device, the verification succeeds, thereby ensuring that the current access can succeed.

S503: The first network management device sends the information (that is, the first information parameter) about the current network operation and maintenance management requirement to the second network management device in the operator NMS, and the second network management device receives the first information parameter from the first network management device.

Optionally, the first network device may send the first information parameter through a service proxy interface between the first network device and the operator NMS. In this way, the first network management device may send the information about the current network operation and maintenance management requirement to the second network management device in the operator NMS through the service proxy interface, to entrust the operator to invoke the first service in the EMS to access the first information indicated by the first information parameter.

Optionally, when performing S503, the first network management device may further send the identifier of the target tenant to the second network management device.

S504: The second network management device sends the identifier of the target tenant and the first information parameter to the element management device, and the element management device receives the identifier of the target tenant and the first information parameter from the second network management device.

The identifier of the target tenant and the first information parameter indicate the element management device to send, to the first network management device, the first information indicated by the first information parameter.

In an implementation, the second network management device may include the identifier of the target tenant and the first information parameter in an access request for sending. That is, S504 includes the following steps.

The second network management device sends the access request to the element management device, and the element management device receives the access request from the second network management device. The access request includes the identifier of the target tenant and the first information parameter, and the access request is for requesting to access, by using the first service, the first information indicated by the first information parameter.

In this implementation, the access request is transmitted through a service invoking interface that corresponds to the first service and that is between the second network management device and the element management device. Therefore, the access request may be carried in a service invoking request message, and the service invoking request message meets a specification of the service invoking interface corresponding to the first service on a type, a format, and data content of a message.

In an implementation, before performing S504, the second network management device may further perform permission verification on the first network management device. Specifically, the method may include the following.

The second network management device determines that the first service needs to be invoked to access the first information. When the second network management device stores the service permission information of the target tenant, the second network management device may verify, based on the service permission information, that the first network management device has no permission to invoke the first service, that is, determine that the authorization service indicated by the service permission information includes the first service.

When the second network management device stores the access permission information of the target tenant, the second network management device may verify, based on the access permission information, that the first network management device has the permission to access the first information, that is, determine that the authorization information indicated by the access permission information includes the first information.

The second network management device performs permission verification on the first network management device, and performs S504 after the service invoking permission verification fails and the access permission verification succeeds. This can ensure that when the element management device performs access permission verification on the first network management device, the verification succeeds, thereby ensuring that the current access can succeed.

In an implementation, to identify that the current access is initiated by the target tenant or initiated by the tenant NMS of the target tenant, the access request may further include the identifier of the target tenant. The identifier of the target tenant may be any information that can uniquely identify the target tenant.

S505: The element management device obtains the first information based on the access permission information, the identifier of the target tenant, and the first information parameter.

In an implementation, when performing S505, the element management device may first perform access permission verification on the first network management device, and after the verification succeeds, invoke the first service to obtain the first information. This may specifically include the following steps.

The element management device verifies, based on the access permission information and the identifier of the target tenant, that the first network management device has the permission to access the first information. For example, the network management device first obtains the access permission information of the target tenant based on the identifier of the target tenant, and then determines that the authorization information indicated by the access permission information includes the first information, that is, may determine that the first network management device has the permission to access the first information. To be specific, the access permission verification of the first network management device succeeds.

Then, the element management device invokes the first service based on the first information parameter, and performs a service operation of the first service, to obtain the first information indicated by the first information parameter.

It should be further noted that, when the second network management device performs S504 by sending the access request, after successfully invoking the first service, the element management device may send an access response to the second network management device, where the access response indicates that the first service is successfully invoked.

S506: The element management device sends the first information to the first network management device, and the first network management device receives the first information from the element management device.

In this step, the element management device may determine, based on the identifier of the target tenant, that a transmission target of the first information is the first network management device.

Because there is no service invoking interface of the first service between the element management device and the first network management device, the element management device may transmit the first information through a data transmission interface between the element management device and the first network management device. Optionally, the element management device may alternatively encrypt the first information when transmitting the first information. Correspondingly, when receiving the encrypted first information, the first network management device further needs to perform decryption to obtain the first information.

In conclusion, this embodiment of this application provides a communication method. This solution supports a tenant that has no permission to invoke some services in the network operation and maintenance architecture. In the method, when the target tenant has a network operation and maintenance management requirement for accessing target information, if the tenant NMS of the target tenant has no permission to invoke a target service, the tenant NMS of the target tenant needs to send the network operation and maintenance management requirement to the operator NMS, and the operator NMS communicates and interacts with the EMS to invoke the target service. In addition, to ensure security of an operation result, after performing a service operation of the target service to obtain the target information, the EMS may directly send the target information to the tenant NMS of the target tenant instead of sending the target information to the operator NMS. In the method, although service invoking and information access processes are implemented through interaction between the second network management device in the operator NMS and the element management device in the EMS, the final target information is sent by the element management device to the first network management device without passing through the second network management device. Therefore, privacy leakage is not caused in the method, and information security can be ensured. In conclusion, the method can ensure information security of the private network in the network operation and maintenance architecture.

Based on the foregoing embodiments, this application further provides the following two examples. Both an example 1 and an example 2 may be applied to the operation and maintenance architecture shown in FIG. 2. It should be noted that, based on logical function division, in this architecture, a first network management device in a tenant NMS is referred to as a tenant service invoking module. A second network management device in an operator NMS is referred to as an operator service invoking module. An element management device in an EMS may be divided into a tenant management module and a service providing module. The tenant management module is configured to provide tenant management and tenant permission management functions. The service providing module is configured to provide various network operation and maintenance management services.

Figure 6A:
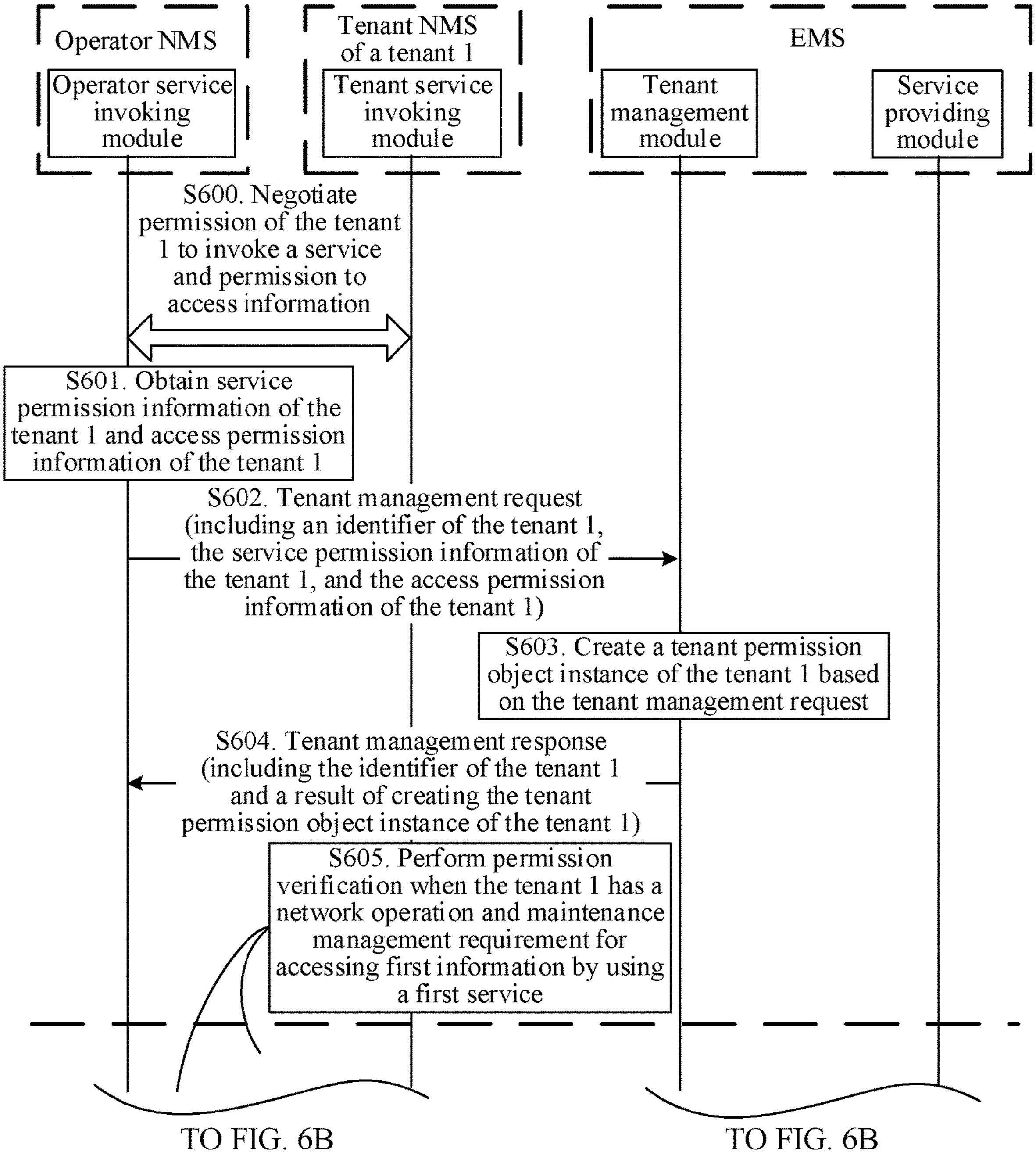
FIG. 6A, FIG. 6B, and FIG. 6C are a flowchart of an example of a communication method according to an embodiment of this application.
Figure 6B:
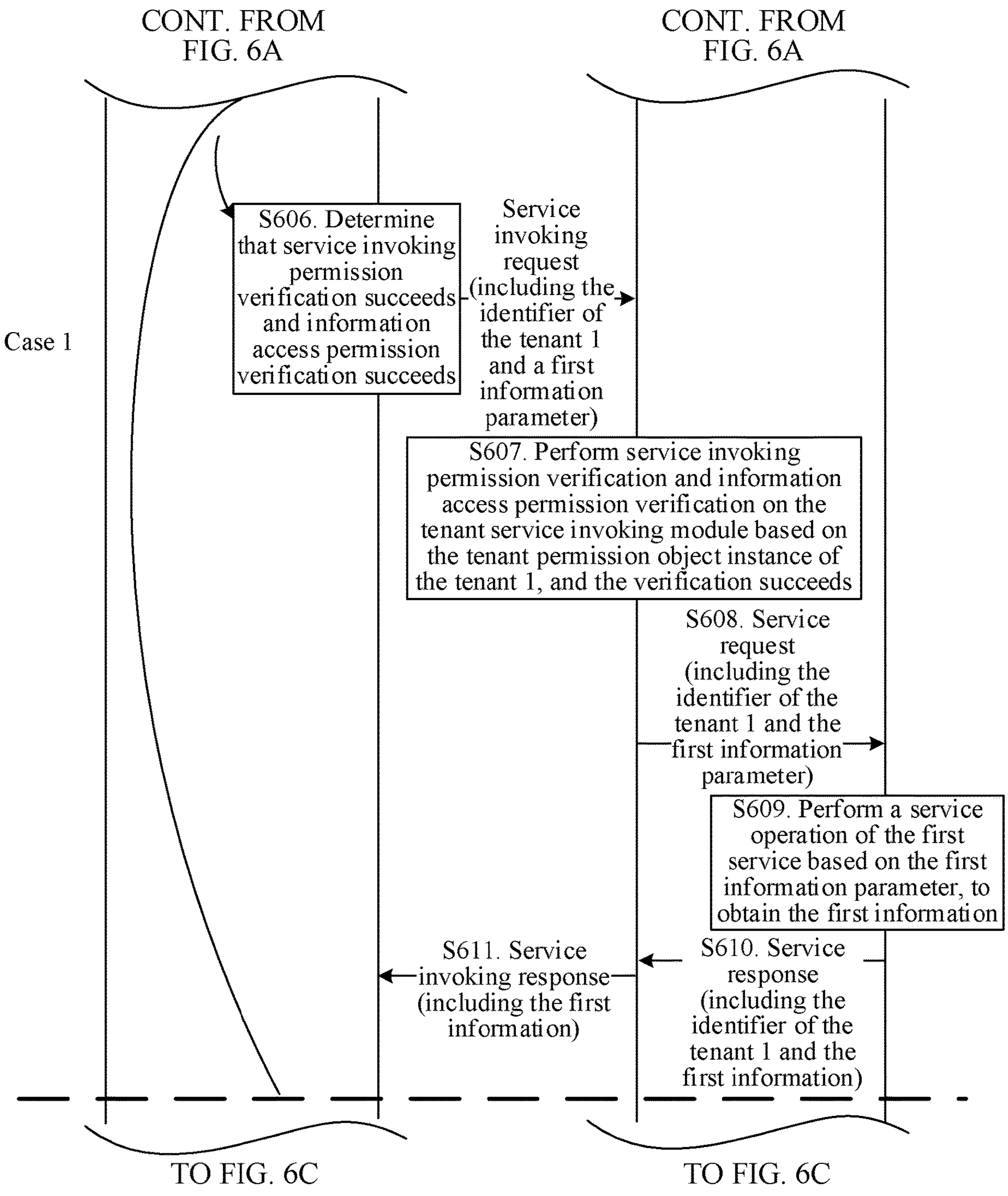
Figure 6C:
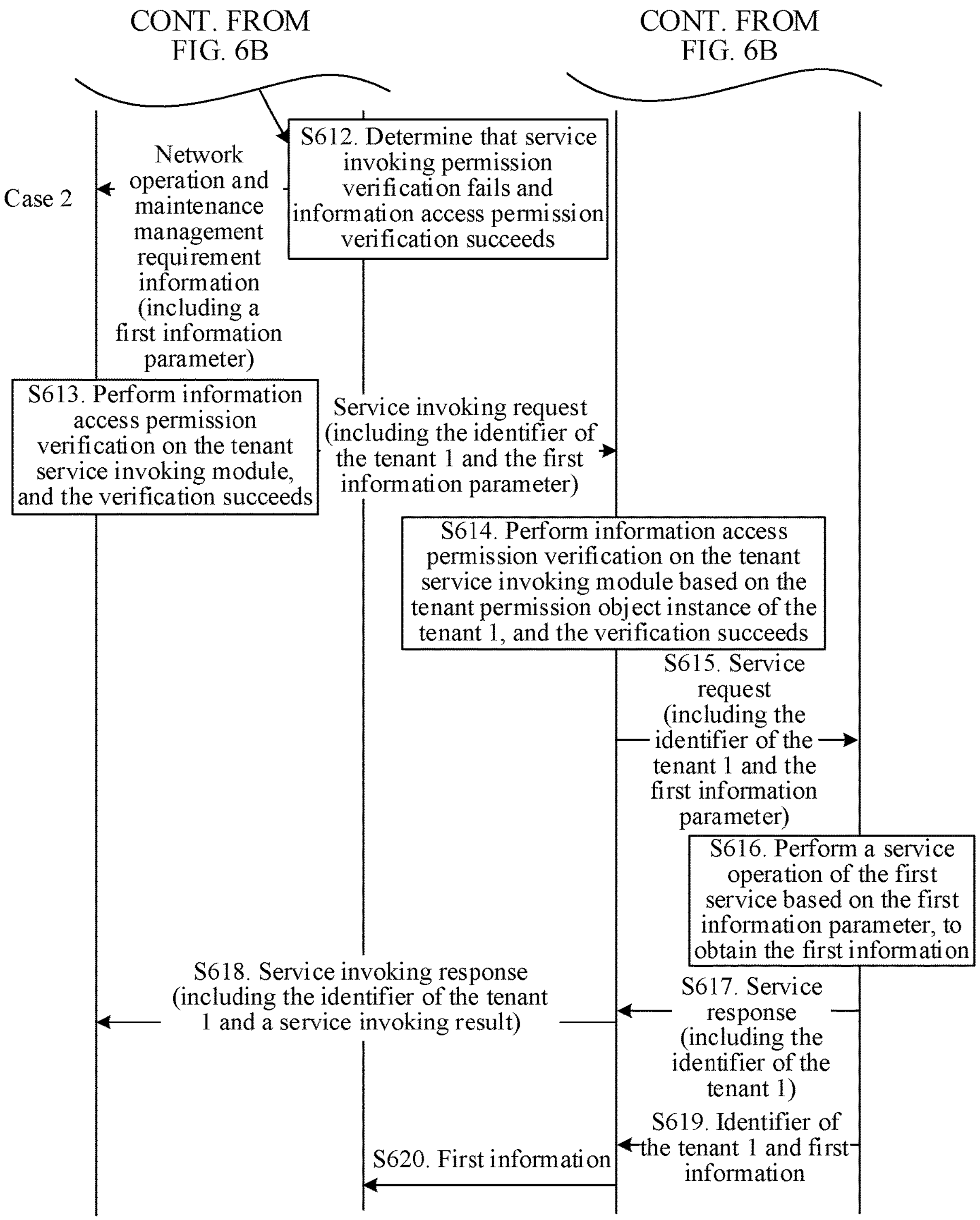

Example 1: In this example, a tenant 1 that pre-negotiates service invoking permission with an operator in the architecture shown in FIG. 2 is used as an example. The following describes steps in this example in detail by referring to a flowchart shown in FIG. 6A, FIG. 6B, and FIG. 6C.

S600: The tenant 1 negotiates with the operator about permission of the tenant 1 to invoke a service, and determines service permission information of the tenant 1. The tenant 1 negotiates with the operator about permission of the tenant 1 to access information, and determines access permission information of the tenant 1.

In this example, the tenant 1 and the operator may negotiate, in an online negotiation manner or an offline negotiation manner, the permission of the tenant 1 to invoke the service and/or the permission to access the information. For a specific process, refer to the descriptions in S300 in the embodiment shown in FIG. 3, and details are not described herein again.

S601: An operator service invoking module in an operator NMS obtains the service permission information of the tenant 1 and the access permission information of the tenant 1.

Optionally, the operator service invoking module may receive the service permission information of the tenant 1 and/or the access permission information of the tenant 1 from a tenant service invoking module in a tenant NMS of the tenant 1. Alternatively, a network management user of the operator NMS may upload the service permission information of the tenant 1 and/or the access permission information of the tenant 1 to the operator service invoking module. Alternatively, when the tenant 1 and the operator negotiate in the online negotiation manner, after the negotiation is completed, the operator service invoking module may determine the service permission information of the tenant 1 and/or the access permission information of the tenant 1 based on a negotiation result. In conclusion, a manner in which the operator service invoking module obtains the service permission information of the tenant 1 and the access permission information of the tenant 1 is not limited in this application.

S602: The operator service invoking module sends a tenant management request to a tenant management module in an EMS. The tenant management request includes an identifier of the tenant 1, the service permission information of the tenant 1, and the access permission information of the tenant 1. The tenant management request is for requesting the tenant management module to manage the permission of the tenant 1.

It should be noted that, when the EMS stores the service permission information of the tenant 1, the tenant management request may not include the service permission information of the tenant 1. Similarly, when the EMS stores the access permission information of the tenant 1, the tenant management request may alternatively not include the access permission information of the tenant 1.

For example, the access permission information of the tenant 1 in the tenant management request may be represented as the following code:

```
'DataAccessPermission':
{
'AlarmType':['Communications Alarm', 'Processing Error Alarm'],
'PMkpi':['PacketDelay', 'RadioResourceUtilization']},
}
'ResourceAccessPermission':
'MOType':['NRCellCU'],
'MOIid':['AABB-AB-BA']},
}
```

The foregoing code may indicate that the tenant 1 may access the following information in a resource object instance whose class is NRCellCU and whose ID is AABB-AB-BA:

'Communications Alarm' (communication alarm data), 'Processing Error Alarm' (processing error alarm data), 'PacketDelay' (data packet delay), and 'RadioResourceUtilization' (radio resource utilization).

S603: The tenant management module in the EMS creates a tenant permission object instance of the tenant 1 based on the tenant management request.

Figure 3:
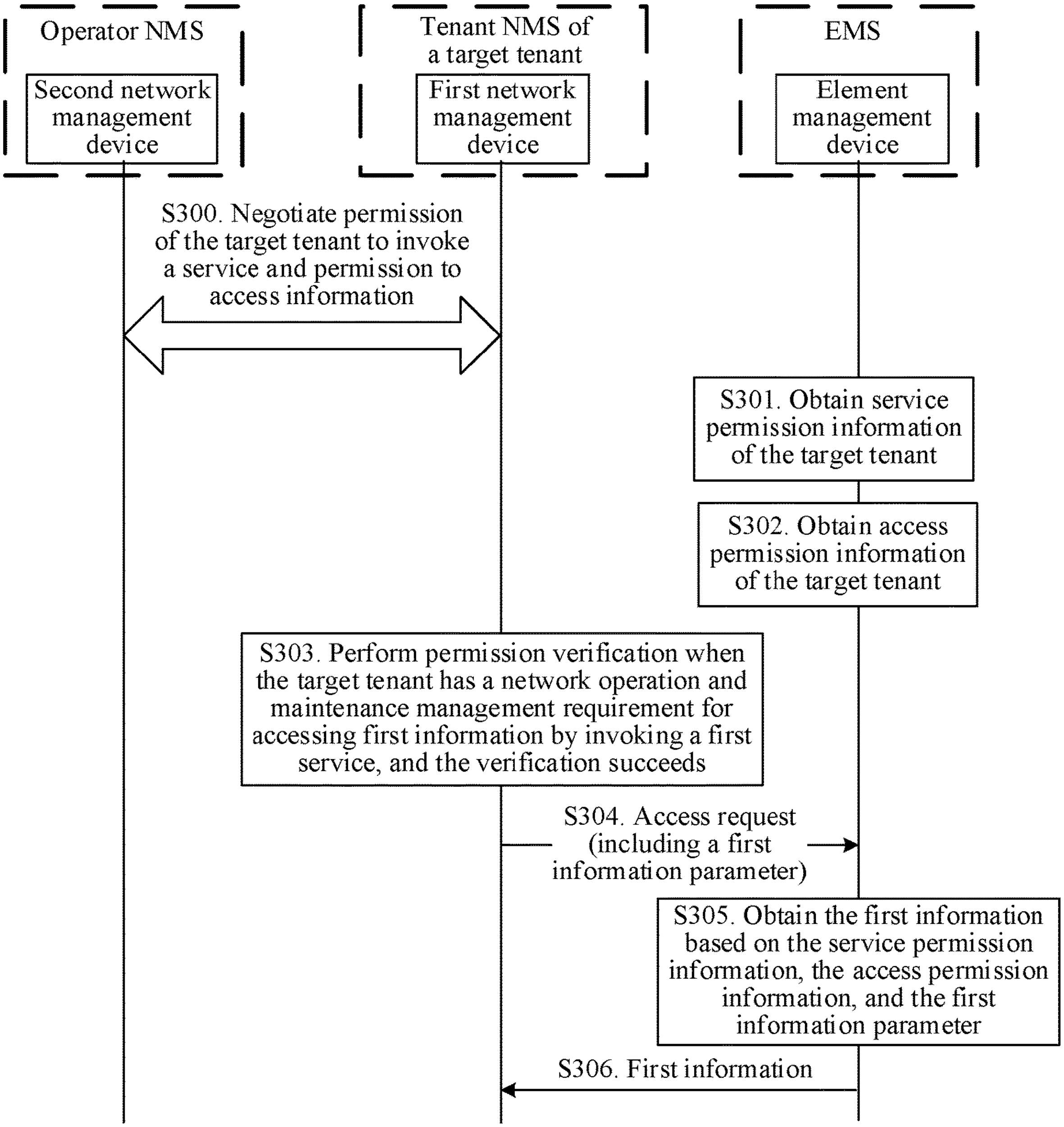
FIG. 3 is a flowchart of a communication method according to an embodiment of this application.
Figure 4:
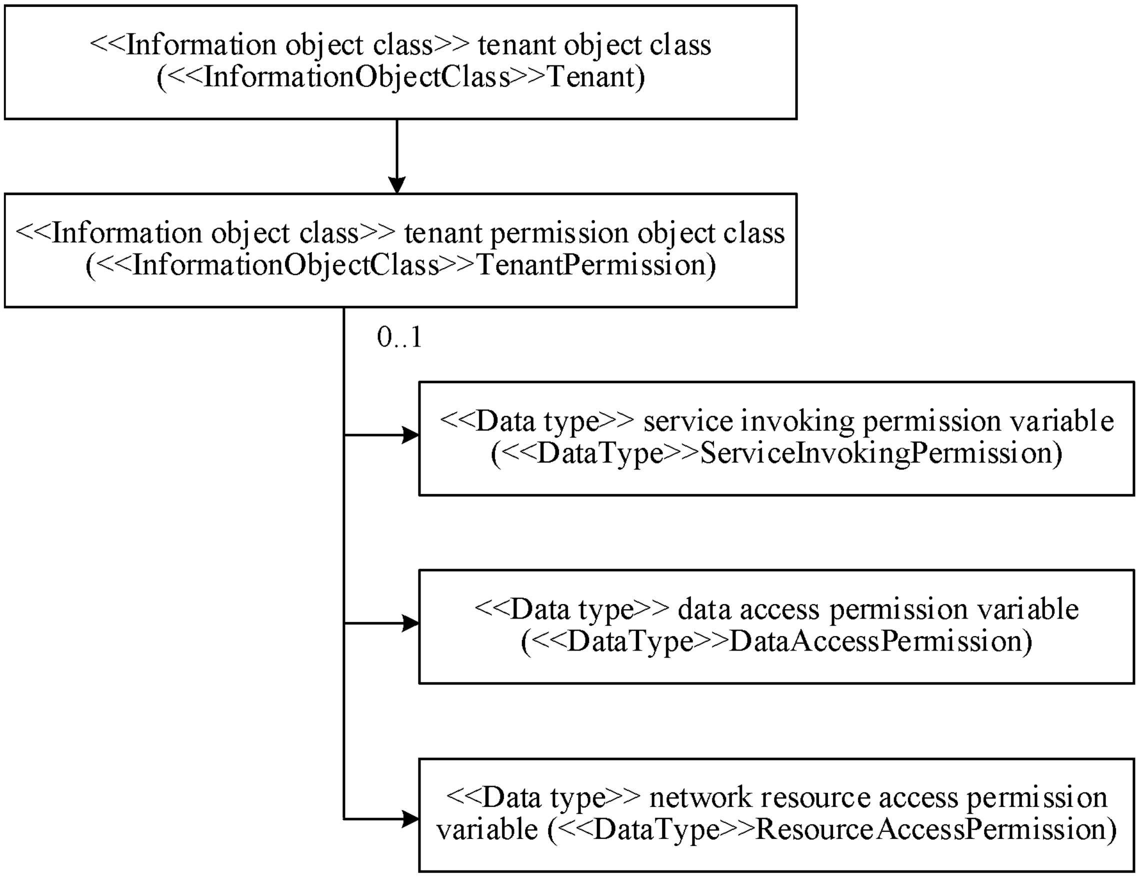
FIG. 4 is a schematic diagram of an architecture of a tenant object class and a tenant permission object class according to an embodiment of this application.

Optionally, the tenant management module may maintain a tenant permission object model, for example, as shown in FIG. 4. The tenant management module may instantiate the tenant permission object model based on the service permission information of the tenant 1 and the access permission information of the tenant 1, that is, assign values to a service permission information variable (a first variable for short) of the tenant and an access permission information variable (a second variable for short) of the tenant in the tenant permission object model, to create the tenant permission object instance of the tenant 1. For the foregoing process of creating the tenant permission object instance of the tenant 1, refer to the descriptions in S301 and S302 in the embodiment shown in FIG. 3. Details are not described herein again.

S604: After creating the tenant permission object instance of the tenant 1, the tenant management module sends a tenant management response to the operator service invoking module in the operator NMS. The tenant management response is for notifying a result (successful or unsuccessful) of creating the tenant permission object instance of the tenant 1. The tenant management response may further include the identifier of the tenant 1.

S605: When the tenant 1 has a network operation and maintenance management requirement for accessing first information by using a first service, the tenant service invoking module in the tenant NMS of the tenant 1 performs permission verification on the tenant service invoking module, including service invoking permission verification and information access permission verification.

In a process of performing S605, the tenant service invoking module may perform permission verification in the following manner.

When storing the service permission information of the tenant 1, the tenant service invoking module may verify, based on the service permission information, whether the tenant service invoking module has permission to invoke the first service, that is, determine whether an authorization service indicated by the service permission information includes the first service.

When storing the access permission information of the tenant 1, the tenant service invoking module may verify, based on the access permission information, whether the tenant service invoking module has permission to access the first information, that is, determine whether authorization information indicated by the access permission information includes the first information.

Based on different verification results, there are two cases in this example. The following respectively describes execution processes under different verification results.

Case 1: The verification result is that the service invoking permission verification of the tenant service invoking module succeeds, and the information access permission verification succeeds. To be specific, the authorization service indicated by the service permission information of the tenant 1 includes the first service, and the authorization information indicated by the access permission information of the tenant 1 includes the first information. In this case, by using the method procedure provided in the embodiment shown in FIG. 3, the tenant service invoking module may invoke the first service to access the first information.

S606: When the tenant service invoking module determines that the service invoking permission verification of the tenant service invoking module succeeds and the information access permission verification succeeds, the tenant service invoking module sends a service invoking request to the tenant management module in the EMS. The service invoking request includes the identifier of the tenant 1 and a first information parameter. The first information parameter indicates the first information.

S607: After receiving the service invoking request, the tenant management module determines a tenant permission object of the tenant 1 based on the identifier of the tenant 1, and performs service invoking permission verification and information access permission verification on the tenant service invoking module based on the tenant permission object instance of the tenant 1, and the verification succeeds.

In this step, the tenant management module may verify, based on the service permission information of the tenant 1 described by the tenant permission object instance of the tenant 1, whether the tenant service invoking module has the permission to invoke the first service, that is, determine whether the authorization service indicated by the service permission information includes the first service.

The tenant management module may verify, based on the access permission information of the tenant 1 described by the tenant permission object instance of the tenant 1, whether the tenant service invoking module has the permission to access the first information, that is, determine whether the authorization information indicated by the access permission information includes the first information.

S608: The tenant management module sends a service request to a service providing module, where the service request includes the identifier of the tenant 1 and the first information parameter.

S609: The service providing module performs a service operation of the first service based on the first information parameter, to obtain the first information.

S610: The service providing module sends a service response to the tenant management module, where the service response includes the identifier of the tenant 1 and the first information.

S611: The tenant management module sends a service invoking response to the tenant service invoking module in the tenant NMS of the tenant 1. The service invoking response includes the first information. Optionally, the service invoking response may further include the identifier of the tenant 1.

Case 2: The verification result is that the service invoking permission verification of the tenant service invoking module fails, and the information access permission verification succeeds. To be specific, the authorization service indicated by the service permission information of the tenant 1 does not include the first service, and the authorization information indicated by the access permission information of the tenant 1 includes the first information. In this case, by using the method procedure provided in the embodiment shown in FIG. 5, the tenant service invoking module may invoke the first service through the operator service invoking module in the operator NMS to implement access to the first information.

S612: When the tenant service invoking module determines that the service invoking permission verification of the tenant service invoking module fails, and the information access permission verification succeeds, the tenant service invoking module sends network operation and maintenance management requirement information to the operator service invoking module in the operator NMS. The network operation and maintenance management requirement information includes a first information parameter, and the first information parameter indicates the first information.

Optionally, the network operation and maintenance management requirement information may further include the identifier of the tenant 1.

S613: The operator service invoking module performs information access permission verification on the tenant service invoking module, and sends a service invoking request to the tenant management module in the EMS after the verification succeeds. The service invoking request includes the identifier of the tenant 1 and the first information parameter.

When storing the access permission information of the tenant 1, the operator service invoking module may verify, based on the access permission information, whether the tenant service invoking module has permission to access the first information, that is, determine whether the authorization information indicated by the access permission information includes the first information.

S614: After receiving the service invoking request, the tenant management module determines a tenant permission object of the tenant 1 based on the identifier of the tenant 1, and performs information access permission verification on the tenant service invoking module based on the tenant permission object instance of the tenant 1, and the verification succeeds.

In this step, the tenant management module may verify, based on the access permission information of the tenant 1 described by the tenant permission object instance of the tenant 1, whether the tenant service invoking module has the permission to access the first information, that is, determine whether the authorization information indicated by the access permission information includes the first information.

S615: The tenant management module sends a service request to a service providing module, where the service request includes the identifier of the tenant 1 and the first information parameter.

S616: The service providing module performs a service operation of the first service based on the first information parameter, to obtain the first information.

S617: When successfully running the first service, the service providing module sends a service response to the tenant management module, where the service response includes the identifier of the tenant 1. The service response indicates that the first service is successfully invoked.

S618: The tenant management module sends a service invoking response to the operator service invoking module in the operator NMS. The service invoking response includes the identifier of the tenant 1 and a service invoking result. The service invoking result indicates that the first service is successfully invoked.

S619: After obtaining the first information, the service providing module sends the identifier of the tenant 1 and the first information to the tenant management module.

S620: The tenant management module sends the first information to the tenant service invoking module in the tenant NMS of the tenant 1.

In this example, when the tenant 1 and the operator pre-negotiate the permission to invoke the service, if the tenant 1 has the network operation and maintenance management requirement for accessing the first information by using the first service, the tenant 1 can successfully access the first information regardless of whether the tenant 1 has the permission to invoke the first service. In addition, the first information is transmitted between the EMS and the tenant NMS of the tenant 1 without passing through the operator NMS. Therefore, security of the first information can be ensured.

Figure 7A:
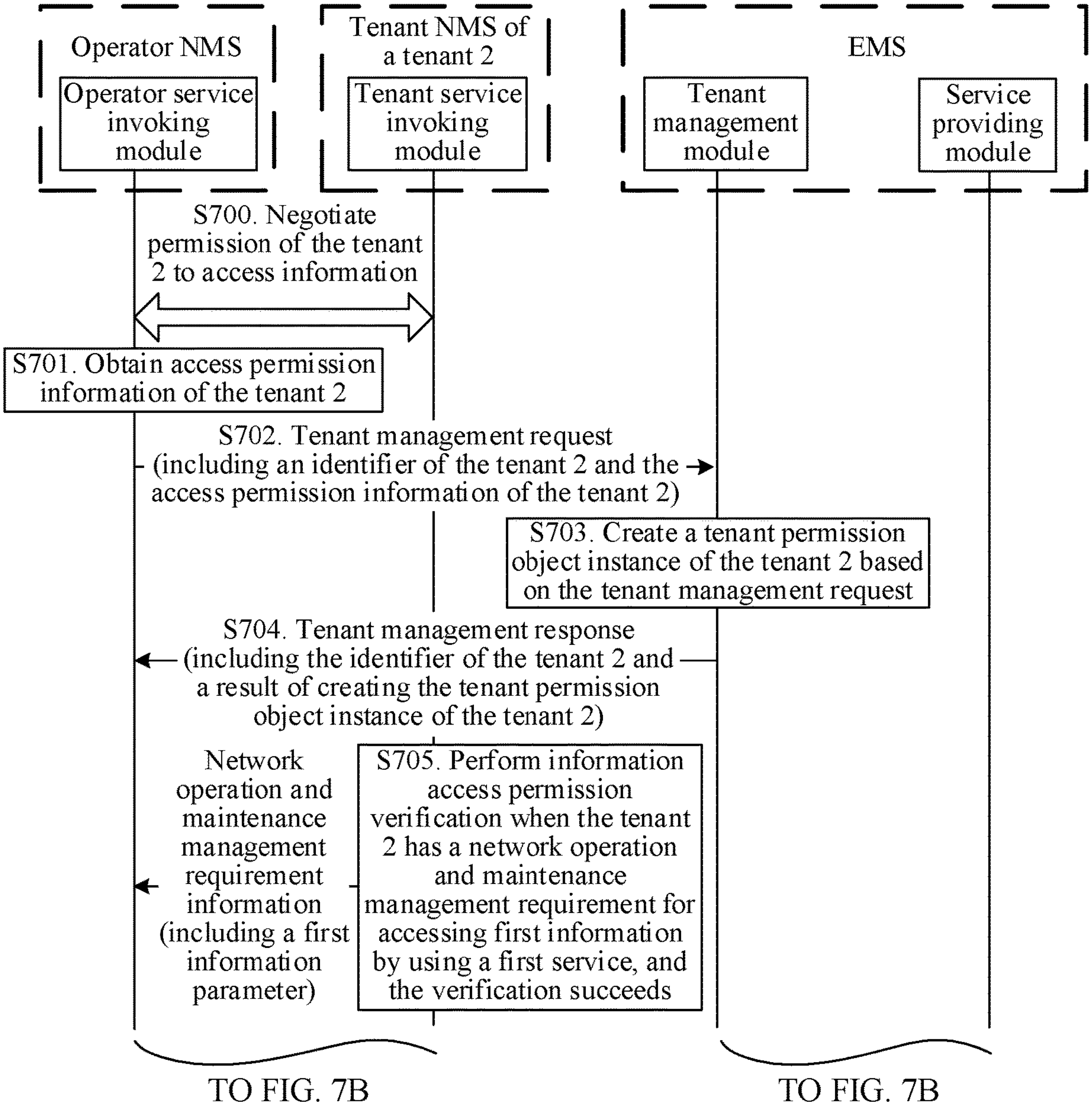
FIG. 7A and FIG. 7B are a flowchart of an example of another communication method according to an embodiment of this application.
Figure 7B:
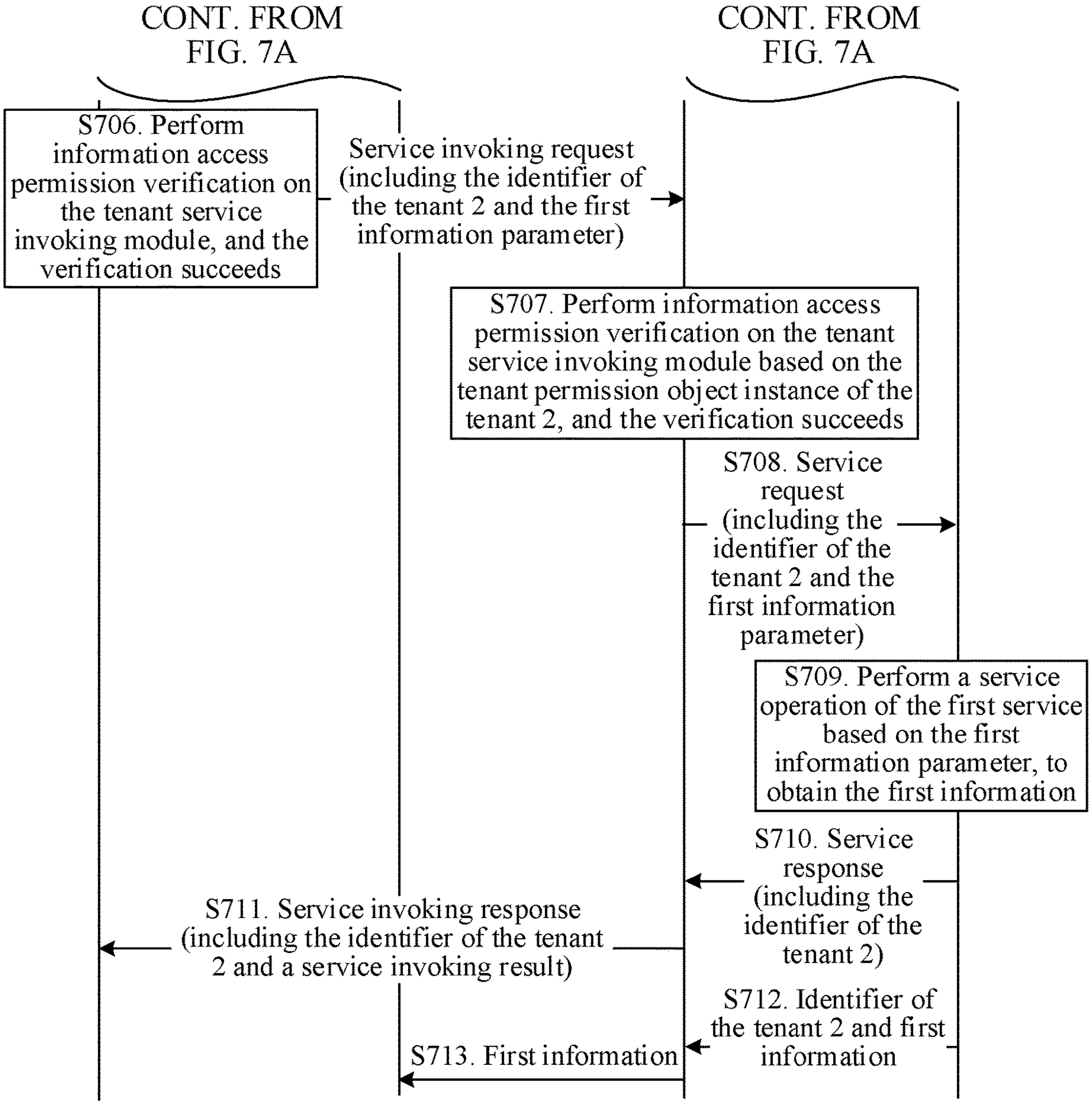

Example 2: In this example, a tenant 2 that does not pre-negotiate service invoking permission with an operator in the architecture shown in FIG. 2 is used as an example. The following describes steps in this example in detail by referring to a flowchart shown in FIG. 7A and FIG. 7B.

S700: The tenant 2 negotiates with the operator about permission of the tenant 2 to access information, and determines access permission information of the tenant 2.

In this example, the tenant 2 and the operator may negotiate, in an online negotiation manner or an offline negotiation manner, the permission of the tenant 2 to access the information. For a specific process, refer to the descriptions in S500 in the embodiment shown in FIG. 5, and details are not described herein again.

S701: An operator service invoking module in an operator NMS obtains the access permission information of the tenant 2.

Optionally, the operator service invoking module may receive the access permission information of the tenant 2 from a tenant service invoking module in a tenant NMS of the tenant 2. Alternatively, a network management user of the operator NMS may upload the access permission information of the tenant 2 to the operator service invoking module. Alternatively, when the tenant 2 and the operator negotiate in the online negotiation manner, after the negotiation is completed, the operator service invoking module may determine the access permission information of the tenant 2 based on a negotiation result. In conclusion, a manner in which the operator service invoking module obtains the access permission information of the tenant 2 is not limited in this application.

S702: The operator service invoking module sends a tenant management request to a tenant management module in an EMS. The tenant management request includes an identifier of the tenant 2 and the access permission information of the tenant 2. The tenant management request is for requesting the tenant management module to manage the permission of the tenant 2.

It should be noted that, when the EMS stores the access permission information of the tenant 2, the tenant management request may alternatively not include the access permission information of the tenant 2.

For example, the access permission information of the tenant 2 included in the tenant management request may be represented as the following code:

```
'DataAccessPermission':
{
'AlarmType':['Communications Alarm', 'Processing Error Alarm'],
'PMkpi':['PacketDelay', 'RadioResourceUtilization']},
}
'ResourceAccessPermission':
{
'MOType':['NRCellCU'],
'MOIid':['AABB-AB-BA']},
}
```

The foregoing code may indicate that the tenant 2 may access the following information in a resource object instance whose class is NRCellCU and whose ID is AABB-AB-BA:

'Communications Alarm' (communication alarm data), 'Processing Error Alarm' (processing error alarm data), 'PacketDelay' (data packet delay), and 'RadioResourceUtilization' (radio resource utilization).

S703: The tenant management module in the EMS creates a tenant permission object instance of the tenant 2 based on the tenant management request.

Optionally, the tenant management module may maintain a tenant permission object model, for example, as shown in FIG. 4. The tenant management module may instantiate the tenant permission object model based on the access permission information of the tenant 2, that is, assign a value to an access permission information variable of the tenant in the tenant permission object model, to create the tenant permission object instance of the tenant 2. For the foregoing process of creating the tenant permission object instance of the tenant 1, refer to the descriptions in S301 and S302 in the embodiment shown in FIG. 3. Details are not described herein again.

S704: After creating the tenant permission object instance of the tenant 2, the tenant management module sends a tenant management response to the operator service invoking module in the operator NMS. The tenant management response is for notifying a result (successful or unsuccessful) of creating the tenant permission object instance of the tenant 2. The tenant management response may further include the identifier of the tenant 2.

S705: When the tenant 2 has a network operation and maintenance management requirement for accessing the first information, the tenant service invoking module in the tenant NMS of the tenant 2 performs information access permission verification on the tenant service invoking module. When the verification succeeds, the tenant service invoking module sends network operation and maintenance management requirement information to the operator service invoking module in the operator NMS. The network operation and maintenance management requirement includes a first information parameter. The first information parameter indicates the first information.

Optionally, the network operation and maintenance management requirement information may further include the identifier of the tenant 2.

In a process of performing S705, when the tenant service invoking module stores the access permission information of the tenant 2, the tenant service invoking module may verify, based on the access permission information, whether the tenant service invoking module has permission to access the first information, that is, determine whether authorization information indicated by the access permission information includes the first information.

Subsequent steps S706 to S713 are the same as steps S613 to S620 in the example 1. Therefore, for specific processes, reference may be made to each other, and details are not described herein again. The operator service invoking module has permission to invoke all network operation and maintenance management services in the EMS. Therefore, before sending a service invoking request to the tenant management model, the operator service invoking module may determine, by using the network operation and maintenance management requirement information received in S705, a first service that needs to be invoked to access the first information.

In this example, when the tenant 2 has no permission to invoke the service, and if the tenant 2 has the network operation and maintenance management requirement for accessing the first information, the tenant 1 may invoke a corresponding service through the operator NMS, to successfully access the first information. In addition, the first information is transmitted between the EMS and the tenant NMS of the tenant 1 without passing through the operator NMS. Therefore, security of the first information can be ensured.

In the foregoing embodiments provided in this application, various solutions of the communication method provided in embodiments of this application are separately described from perspectives of the devices and interaction between the devices. It may be understood that, to implement the foregoing functions, each device, for example, the element management device, the first network management device, or the second network management device, includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application. The following embodiments separately describe a function of each device from perspectives of a software module and a hardware structure.

Figure 8:
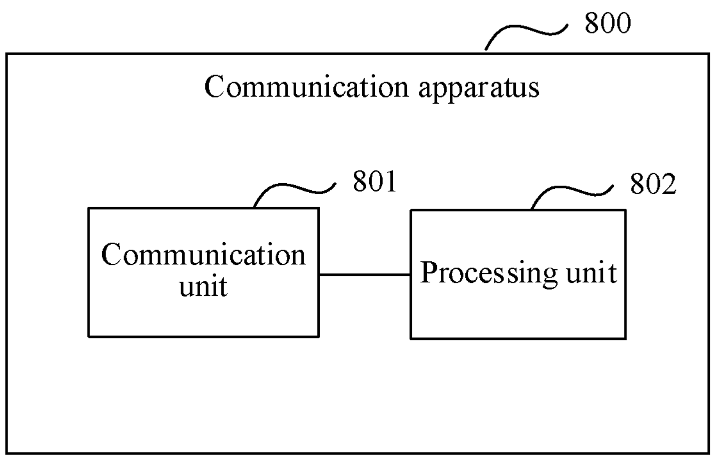
FIG. 8 is a diagram of a structure of a communication apparatus according to an embodiment of this application.

Based on a same technical concept, an embodiment of this application further provides a communication apparatus. The communication apparatus may be used in the network operation and maintenance architecture shown in FIG. 2, and is configured to implement the method provided in the foregoing embodiments and examples. Refer to FIG. 8. The communication apparatus 800 includes a communication unit 801 and a processing unit 802.

The communication unit 801 is configured to receive and send data. For example, the communication unit 801 may be implemented by using a physical interface, a communication module, a communication interface, or an input/output interface. The communication apparatus 800 may be connected to a network cable or a cable by using the communication unit 801, to establish a physical connection to another device.

The following describes a function of the processing unit 802 when the communication apparatus 800 is used in each device in the network operation and maintenance architecture shown in FIG. 2.

In an implementation, the communication apparatus 800 is used in the element management device in the EMS in the embodiment shown in FIG. 3, and the processing unit 802 is configured to:

obtain service permission information of a target tenant, where the service permission information indicates that a first network management device has permission to invoke a first service, and the first network management device is located in a network management system of the target tenant, and obtain access permission information of the target tenant, where the access permission information indicates that the first network management device has permission to access first information;

receive an access request from the first network management device through the communication unit 801, where the access request includes a first information parameter, and the access request is for requesting to access, by using the first service, the first information indicated by the first information parameter; and send the first information to the first network management device through the communication unit 801 based on the service permission information, the access permission information, and the first information parameter.

Optionally, when obtaining the service permission information of the target tenant, the processing unit 802 is specifically configured to:

receive the service permission information from the first network management device through the communication unit 801;

receive the service permission information from a second network management device through the communication unit 801; or obtain the preconfigured service permission information.

Optionally, that the processing unit 802 obtains the access permission information of the target tenant includes:

receiving the access permission information from the first network management device through the communication unit 801;

receiving the access permission information from the second network management device through the communication unit 801; or obtaining the preconfigured access permission information.

Optionally, the first information includes first network operation and maintenance management data and/or first network resource data.

Optionally, when sending the first information to the first network management device based on the service permission information, the access permission information, and the first information parameter, the processing unit 802 is specifically configured to:

verify, based on the service permission information, that the first network management device has the permission to invoke the first service;

verify, based on the access permission information, that the first network management device has the permission to access the first information;

invoke the first service based on the first information parameter, to obtain the first information indicated by the first information parameter; and send the first information to the first network management device through the communication unit 801.

Optionally, the access request further includes an identifier of the target tenant.

In an implementation, the communication apparatus 800 is used in the first network management device located in the tenant NMS of the target tenant in the embodiment shown in FIG. 3, and the processing unit 802 is configured to:

send service permission information of the target tenant to an element management device through the communication unit 801, where the service permission information indicates that the first network management device has permission to invoke a first service;

send access permission information of the target tenant to the element management device through the communication unit 801, where the access permission information indicates that the first network device has permission to access first information;

send an access request to the element management device through the communication unit 801, where the access request includes a first information parameter, and the access request is for requesting to access, by using the first service, the first information indicated by the first information parameter; and receive the first information from the element management device through the communication unit 801.

Optionally, the first information includes first network operation and maintenance management data and/or first network resource data.

Optionally, the access request further includes an identifier of the target tenant.

Optionally, the processing unit 802 is further configured to:

before sending the access request to the element management device through the communication unit 801, verify, based on the service permission information, that the first network management device has the permission to invoke the first service; and verify, based on the access permission information, that the first network management device has the permission to access the first information.

Figure 5:
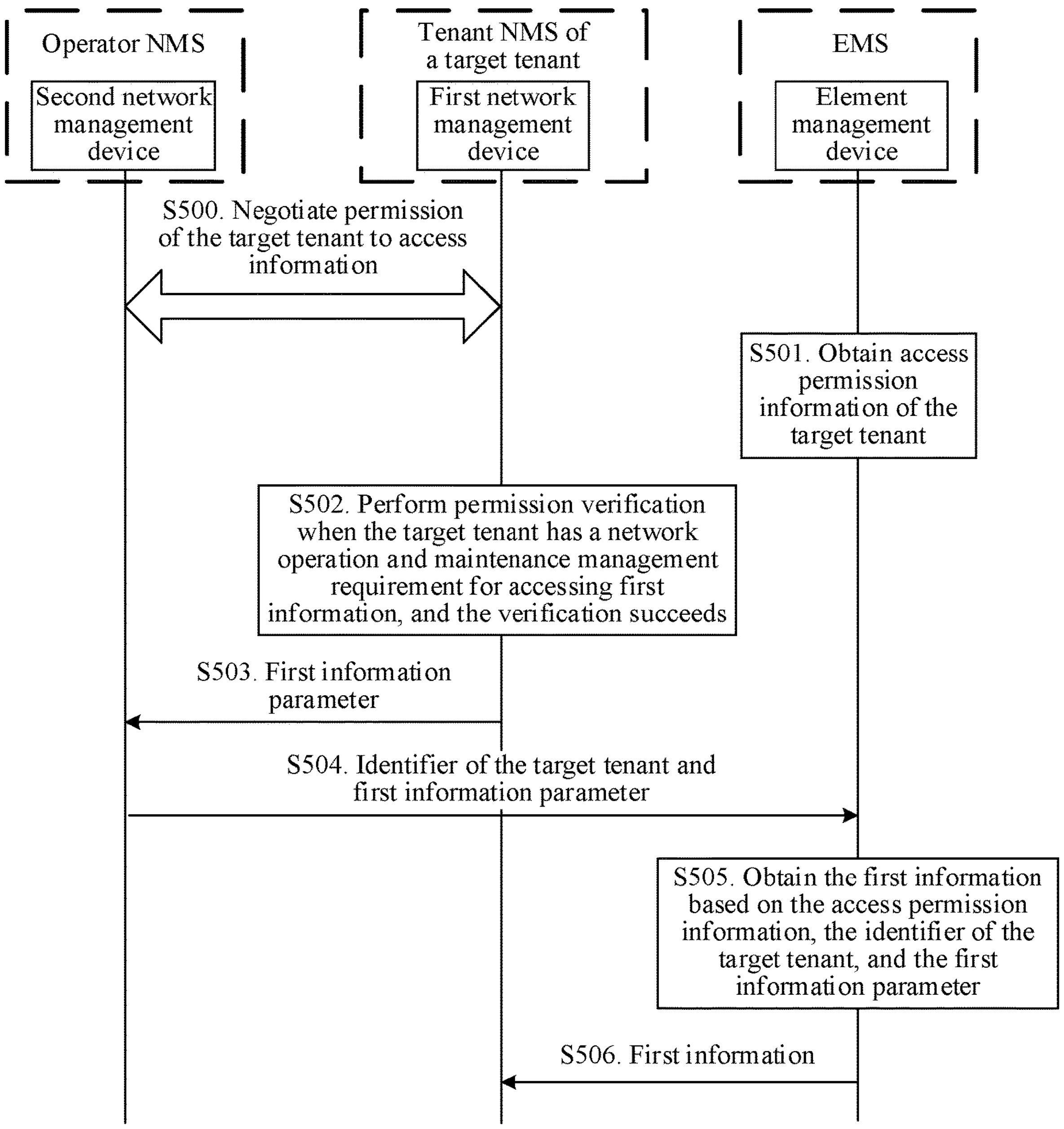
FIG. 5 is a flowchart of another communication method according to an embodiment of this application.

In an implementation, the communication apparatus 800 is used in the element management device in the EMS in the embodiment shown in FIG. 5, and the processing unit 802 is configured to:

obtain access permission information of a target tenant, where the access permission information indicates that a first network management device has permission to access first information, and the first network management device is located in a network management system of the target tenant;

receive an identifier of the target tenant and a first information parameter from a second network management device through the communication unit 801, where the first information parameter indicates the first information; and send, to the first network management device through the communication unit 801 based on the access permission information, the identifier of the target tenant, and the first information parameter, the first information indicated by the first information parameter.

Optionally, when receiving the identifier of the target tenant and the first information parameter from the second network management device through the communication unit 801, the processing unit 802 is specifically configured to:

receive an access request from the second network management device through the communication unit 801, where the access request includes the identifier of the target tenant and the first information parameter, and the access request is for requesting to access, by using a first service, the first information indicated by the first information parameter, where the first network management device has no permission to invoke the first service, and the second network management device has permission to invoke the first service.

Optionally, the processing unit 802 is further configured to:

receive indication information from the second network management device through the communication unit 801, where the indication information indicates to send the first information to the first network management device.

Optionally, when obtaining the access permission information of the target tenant, the processing unit 802 is specifically configured to:

receive the access permission information from the first network management device through the communication unit 801;

receive the access permission information from the second network management device through the communication unit 801; or obtain the preconfigured access permission information.

Optionally, the first information includes first network operation and maintenance management data and/or first network resource data.

Optionally, when sending, to the first network management device based on the access permission information, the identifier of the target tenant, and the first information parameter, the first information indicated by the first information parameter, the processing unit 802 is specifically configured to:

verify, based on the identifier of the target tenant and the access permission information, that the first network management device has the permission to access the first information;

invoke the first service based on the first information parameter, to obtain the first information; and send the first information to the first network management device through the communication unit 801.

Optionally, the processing unit 802 is further configured to:

send an access response to the second network management device through the communication unit 801, where the access response indicates that the first service is successfully invoked.

In an implementation, the communication apparatus 800 is used in the second network management device located in the operator NMS in the embodiment shown in FIG. 5, and the processing unit 802 is configured to:

receive a first information parameter from a first network management device through the communication unit 801, where the first network management device is located in a network management system of a target tenant, and the first information parameter indicates first information; and send an identifier of the target tenant and the first information parameter to an element management device through the communication unit 801, where the identifier of the target tenant and the first information parameter indicate the element management device to send, to the first network management device, the first information indicated by the first information parameter.

Optionally, the processing unit 802 is further configured to:

receive the identifier of the target tenant from the first network management device through the communication unit 801.

Optionally, when sending the identifier of the target tenant and the first information parameter to the element management device through the communication unit 801, the processing unit 802 is specifically configured to:

send an access request to the network management device through the communication unit 801, where the access request includes the identifier of the target tenant and the first information parameter, and the access request is for requesting to access, by using a first service, the first information indicated by the first information parameter, where the first network management device has no permission to invoke the first service, and the second network management device has permission to invoke the first service.

Optionally, the processing unit 802 is further configured to:

send indication information to the element management device through the communication unit 801, where the indication information indicates to send the first information to the first network management device.

Optionally, the processing unit 802 is further configured to:

obtain access permission information of the target tenant, where the access permission information indicates that the first network management device has permission to access the first information; and send the access permission information to the element management device through the communication unit 801.

Optionally, when obtaining the access permission information of the target tenant, the processing unit 802 is specifically configured to:

receive the access permission information from the first network management device through the communication unit 801; or obtain the preconfigured access permission information.

Optionally, the processing unit 802 is further configured to:

before sending the identifier of the target tenant and the first information parameter to the element management device through the communication unit 804 verify, based on the access permission information, that the first network management device has the permission to access the first information.

Optionally, the first information includes first network operation and maintenance management data and/or first network resource data.

Optionally, the processing unit 802 is further configured to:

receive an access response from the element management device through the communication unit 801, where the access response indicates that the first service is successfully invoked.

In an implementation, the communication apparatus 800 is used in the first network management device located in the tenant NMS of the target tenant in the embodiment shown in FIG. 5, and the processing unit 802 is configured to:

send a first information parameter to a second network management device through the communication unit 801, where the first information parameter indicates first information; and receive the first information from an element management device through the communication unit 801.

Optionally, the processing unit 802 is further configured to:

send an identifier of the target tenant to the first network management device through the communication unit 801.

Optionally, the processing unit 802 is further configured to:

obtain access permission information of the target tenant, where the access permission information indicates that the first network management device has permission to access the first information; and send the access permission information to the second network management device through the communication unit 801.

Optionally, when obtaining the access permission information of the target tenant, the processing unit 802 is specifically configured to:

obtain the preconfigured access permission information.

Optionally, the processing unit 802 is further configured to:

before sending the first information parameter to the second network management device through the communication unit 801, verify, based on the access permission information, that the first network management device has the permission to access the first information.

Optionally, the first information includes first network operation and maintenance management data and/or first network resource data.

It should be noted that division into the modules in embodiments of this application is an example, is merely division into logical functions, and may be other division during actual implementation. In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) or a processor to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

Figure 9:
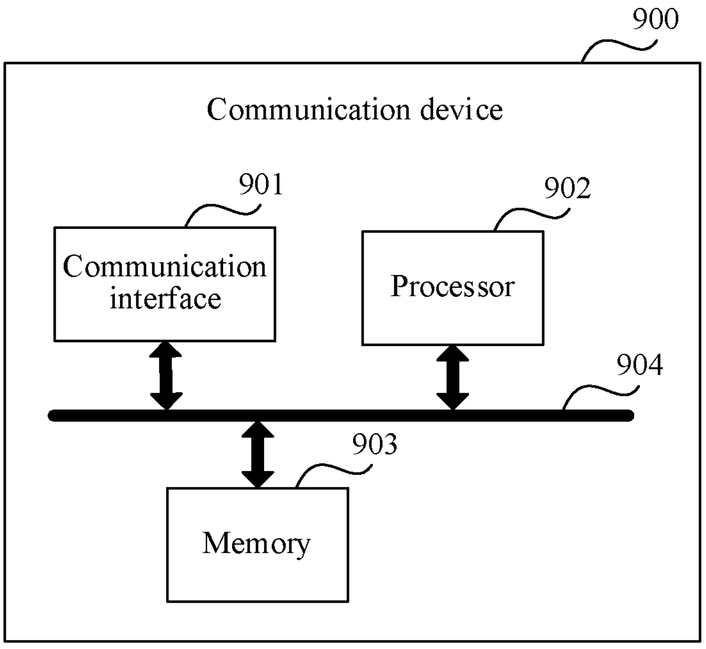
FIG. 9 is a diagram of a structure of a communication device according to an embodiment of this application.

Based on a same technical concept, an embodiment of this application further provides a communication device. The communication device may be used in the network operation and maintenance architecture shown in FIG. 2, can implement the method provided in the foregoing embodiments and examples, and has a function of the communication apparatus 800 provided in the foregoing embodiment. Refer to FIG. 9. The communication device 900 includes a communication interface 901, a processor 902, and a memory 903. The communication interface 901, the processor 902, and the memory 903 are connected to each other.

Optionally, the communication interface 901, the processor 902, and the memory 903 are connected to each other by using a bus 904. The bus 904 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 9, but this does not mean that there is only one bus or only one type of bus.

The communication interface 901 is configured to receive and send data, to implement communication with another device in the network operation and maintenance architecture. The communication interface 901 may be implemented by using a physical interface, a communication module, and an input/output interface.

The processor 902 is configured to implement the method provided in the foregoing embodiments or examples.

In an implementation, the communication device 900 is the element management device in the EMS in the embodiment shown in FIG. 3, and the processor 902 is configured to:

obtain service permission information of a target tenant, where the service permission information indicates that a first network management device has permission to invoke a first service, and the first network management device is located in a network management system of the target tenant, and obtain access permission information of the target tenant, where the access permission information indicates that the first network management device has permission to access first information;

receive an access request from the first network management device through the communication interface 901, where the access request includes a first information parameter, and the access request is for requesting to access, by using the first service, the first information indicated by the first information parameter; and send the first information to the first network management device through the communication interface 901 based on the service permission information, the access permission information, and the first information parameter.

In an implementation, the communication device 900 is the first network management device in the tenant NMS of the target tenant in the embodiment shown in FIG. 3, and the processor 902 is configured to:

send service permission information of the target tenant to an element management device through the communication interface 901, where the service permission information indicates that the first network management device has permission to invoke a first service;

send access permission information of the target tenant to the element management device through the communication interface 901, where the access permission information indicates that the first network device has permission to access first information;

send an access request to the element management device through the communication interface 901, where the access request includes a first information parameter, and the access request is for requesting to access, by using the first service, the first information indicated by the first information parameter; and receive the first information from the element management device through the communication interface 901.

In an implementation, the communication device 900 is the element management device in the EMS in the embodiment shown in FIG. 5, and the processor 902 is configured to:

obtain access permission information of a target tenant, where the access permission information indicates that a first network management device has permission to access first information, and the first network management device is located in a network management system of the target tenant;

receive an identifier of the target tenant and a first information parameter from a second network management device through the communication interface 901, where the first information parameter indicates the first information; and send, to the first network management device through the communication interface 901 based on the access permission information, the identifier of the target tenant, and the first information parameter, the first information indicated by the first information parameter.

In an implementation, the communication device 900 is the second network management device located in the operator NMS in the embodiment shown in FIG. 5, and the processor 902 is configured to:

receive a first information parameter from a first network management device through the communication interface 901, where the first network management device is located in a network management system of a target tenant, and the first information parameter indicates first information; and send an identifier of the target tenant and the first information parameter to an element management device through the communication interface 901, where the identifier of the target tenant and the first information parameter indicate the element management device to send, to the first network management device, the first information indicated by the first information parameter.

In an implementation, the communication device 900 is the first network management device located in the tenant NMS of the target tenant in the embodiment shown in FIG. 5, and the processor 902 is configured to:

send a first information parameter to a second network management device through the communication interface 901, where the first information parameter indicates first information; and receive the first information from an element management device through the communication interface 901.

For a specific function of the processor 902, refer to the descriptions in the foregoing embodiments. Details are not described herein again.

The processor 902 may be a central processing unit (CPU), a network processor (NP), a combination of a CPU and an NP, or the like. The processor 902 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 902 may implement the foregoing functions by hardware or by hardware executing corresponding software.

The memory 903 is configured to store program instructions and the like. Specifically, the program instructions may include program code, and the program code includes computer operation instructions. The memory 903 may include a random access memory (RAM), or may further include a non-volatile memory, for example, at least one magnetic disk memory. The processor 902 executes the program instructions stored in the memory 903, to implement the foregoing functions, thereby implementing the method provided in the foregoing embodiments.

Based on the foregoing embodiments, an embodiment of this application further provides a computer program. When the computer program is run on a computer, the computer is enabled to perform the method provided in the foregoing embodiments.

Based on the foregoing embodiments, an embodiment of this application further provides a computer-readable storage medium. The computer-readable storage medium stores a computer program. When the computer program is executed by a computer, the computer is enabled to perform the method provided in the foregoing embodiments.

The storage medium may be any available medium accessible to the computer. The following provides an example but does not impose a limitation: The computer-readable medium may include a RAM, a ROM, an EEPROM, a CD-ROM or another optical disc storage, a magnetic disk storage medium or another magnetic storage device, or any other medium that can be used to carry or store expected program code in a form of instructions or a data structure and can be accessed by the computer.

Based on the foregoing embodiments, an embodiment of this application further provides a chip. The chip is configured to read a computer program stored in a memory, to implement the method provided in the foregoing embodiments.

Based on the foregoing embodiments, an embodiment of this application provides a chip system. The chip system includes a processor, configured to support a computer apparatus in implementing a function related to the communication device in the foregoing embodiments. In a possible design, the chip system further includes a memory, and the memory is configured to store a program and data that are necessary for the computer apparatus. The chip system may include a chip, or may include a chip and another discrete device.

In conclusion, embodiments of this application provide a communication method, apparatus, and device. According to the method, when a target tenant has a network operation and maintenance management requirement for accessing first information by using a first service, an NMS of the target tenant can successfully access the first information regardless of whether the target tenant has permission to invoke the first service. In addition, the first information is transmitted between an EMS and the tenant NMS of the target tenant without passing through an operator NMS. Therefore, security of the first information can be ensured.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto the computer or the another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. Therefore, this application is intended to cover these modifications and variations of this application if they fall within the scope of claims of this application and equivalent technologies thereof.

What is claimed is:

1. A method, applied to an element management device, wherein the method comprises:

obtaining service permission information of a target tenant, wherein the service permission information indicates that a first network management device has permission to invoke a first service, and the first network management device is located in a network management system of the target tenant;

obtaining access permission information of the target tenant, wherein the access permission information indicates that the first network management device has permission to access first information;

receiving an access request from the first network management device, wherein the access request comprises a first information parameter, and the access request requests to access, by using the first service, the first information indicated by the first information parameter; and sending the first information to the first network management device based on the service permission information, the access permission information, and the first information parameter, wherein the first information comprises at least one of:

(1) maintenance management data that includes network performance management data or network alarm data, or (2) first network resource data that includes data of a network node.

2. The method according to claim 1, wherein the obtaining the service permission information of the target tenant comprises:

receiving the service permission information from the first network management device;

receiving the service permission information from a second network management device; or obtaining the service permission information that is preconfigured.

3. The method according to claim 1, wherein the obtaining the access permission information of the target tenant comprises:

receiving the access permission information from the first network management device;

receiving the access permission information from a second network management device; or obtaining the access permission information that is preconfigured.

4. The method according to claim 1, wherein the sending the first information to the first network management device based on the service permission information, the access permission information, and the first information parameter comprises:

verifying, based on the service permission information, that the first network management device has the permission to invoke the first service;

verifying, based on the access permission information, that the first network management device has the permission to access the first information;

invoking the first service based on the first information parameter, to obtain the first information indicated by the first information parameter; and sending the first information to the first network management device.

5. The method according to claim 1, wherein the access request further comprises an identifier of the target tenant.

6. The method according to claim 1, wherein the first network resource data further includes a usage rate or inventory of a first network resource.

7. The method according to claim 1, wherein the first service includes a service for obtaining at least one of a management object instance parameter, alarm information, or performance data.

8. A method, applied to a first network management device, wherein the first network management device is located in a network management system of a target tenant, and the method comprises:

sending service permission information of the target tenant to an element management device, wherein the service permission information indicates that the first network management device has permission to invoke a first service;

sending access permission information of the target tenant to the element management device, wherein the access permission information indicates that the first network management device has permission to access first information;

sending an access request to the element management device, wherein the access request comprises a first information parameter, and the access request requests to access, by using the first service, the first information indicated by the first information parameter; and receiving the first information from the element management device, wherein the first information comprises at least one of:

(1) maintenance management data that includes network performance management data or network alarm data, or (2) first network resource data that includes data of a network node.

9. The method according to claim 8, wherein the access request further comprises an identifier of the target tenant.

10. The method according to claim 8, wherein the method further comprises:

before the sending the access request to the element management device:

verifying, based on the service permission information, that the first network management device has the permission to invoke the first service; and verifying, based on the access permission information, that the first network management device has the permission to access the first information.

11. A method, applied to an element management device, wherein the method comprises:

obtaining access permission information of a target tenant, wherein the access permission information indicates that a first network management device has permission to access first information, and the first network management device is located in a network management system of the target tenant;

receiving an identifier of the target tenant and a first information parameter from a second network management device, wherein the first information parameter indicates the first information; and sending, to the first network management device based on the access permission information, the identifier of the target tenant, and the first information parameter, the first information indicated by the first information parameter.

12. The method according to claim 11, wherein the receiving the identifier of the target tenant and the first information parameter from the second network management device comprises:

receiving an access request from the second network management device, wherein the access request comprises the identifier of the target tenant and the first information parameter, and the access request requests to access, by using a first service, the first information indicated by the first information parameter, wherein the first network management device has no permission to invoke the first service, and the second network management device has permission to invoke the first service.

13. The method according to claim 11, wherein the method further comprises:

receiving indication information from the second network management device, wherein the indication information indicates to send the first information to the first network management device.

14. The method according to claim 11, wherein the obtaining the access permission information of the target tenant comprises:

receiving the access permission information from the first network management device;

receiving the access permission information from the second network management device; or obtaining the access permission information that is preconfigured.

15. The method according to claim 11, wherein the first information comprises at least one of first network operation and maintenance management data or first network resource data.

16. The method according to claim 11, wherein the sending, to the first network management device based on the access permission information, the identifier of the target tenant, and the first information parameter, the first information indicated by the first information parameter comprises:

verifying, based on the identifier of the target tenant and the access permission information, that the first network management device has the permission to access the first information;

invoking a first service based on the first information parameter, to obtain the first information; and sending the first information to the first network management device.

17. The method according to claim 12, wherein the method further comprises:

sending an access response to the second network management device, wherein the access response indicates that the first service is successfully invoked.

18. An apparatus, comprising:

at least one processor, wherein the at least one processor is configured to execute a computer program stored in a memory, to enable the apparatus to implement:

obtaining service permission information of a target tenant, wherein the service permission information indicates that a first network management device has permission to invoke a first service, and the first network management device is located in a network management system of the target tenant;

obtaining access permission information of the target tenant, wherein the access permission information indicates that the first network management device has permission to access first information;

receiving an access request from the first network management device, wherein the access request comprises a first information parameter, and the access request requests to access, by using the first service, the first information indicated by the first information parameter; and sending the first information to the first network management device based on the service permission information, the access permission information, and the first information parameter, wherein the first information comprises at least one of:

(1) maintenance management data that includes network performance management data or network alarm data, or (2) first network resource data that includes data of a network node.

19. An apparatus, comprising:

at least one processor, wherein the at least one processor is configured to execute a computer program stored in a memory, to enable the apparatus to implement:

sending service permission information of a target tenant to an element management device, wherein the service permission information indicates that a first network management device has permission to invoke a first service;

sending access permission information of the target tenant to the element management device, wherein the access permission information indicates that the first network management device has permission to access first information;

sending an access request to the element management device, wherein the access request comprises a first information parameter, and the access request requests to access, by using the first service, the first information indicated by the first information parameter; and receiving the first information from the element management device, wherein the first information comprises at least one of:

(1) maintenance management data that includes network performance management data or network alarm data, or (2) first network resource data that includes data of a network node.

* * * * *